United States Patent
Hirota et al.

(10) Patent No.: US 7,276,574 B2
(45) Date of Patent: Oct. 2, 2007

(54) PROCESS FOR PRODUCING VINYL POLYMER

(75) Inventors: Akihisa Hirota, Settsu (JP); Kosuke Tanaka, Settsu (JP); Shigeru Hagimori, Settsu (JP); Yosuke Asai, Settsu (JP); Naoki Furukawa, Himeji (JP); Masanao Takeda, Settsu (JP); Nao Fujita, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 338 days.

(21) Appl. No.: 10/491,187

(22) PCT Filed: Oct. 17, 2002

(86) PCT No.: PCT/JP02/10775

§ 371 (c)(1),
(2), (4) Date: Aug. 24, 2004

(87) PCT Pub. No.: WO03/033546

PCT Pub. Date: Apr. 24, 2003

(65) Prior Publication Data

US 2005/0014912 A1    Jan. 20, 2005

(30) Foreign Application Priority Data

Oct. 17, 2001 (JP) ............................. 2001-318941
Nov. 5, 2001 (JP) ............................. 2001-339039

(51) Int. Cl.
*C08F 6/00* (2006.01)
*C08F 4/80* (2006.01)

(52) U.S. Cl. .................. 528/482; 528/488; 528/490; 528/499; 526/135; 526/171

(58) Field of Classification Search ............... 528/482, 528/488, 490, 499, 135, 171
See application file for complete search history.

(56) References Cited

U.S. PATENT DOCUMENTS

| 5,741,888 | A | 4/1998 | Weyer et al. |
| 5,789,487 | A | 8/1998 | Matyjaszewski et al. |
| 6,348,554 | B1 | 2/2002 | Roos et al. |
| 6,794,461 | B2 * | 9/2004 | Fujita et al. ............. 525/330.4 |

FOREIGN PATENT DOCUMENTS

| CN | 1210111 | 3/1999 |
| CN | 1210111 A | 3/1999 |
| EP | 0 789 036 A2 | 8/1997 |
| EP | 0 808 850 A1 | 11/1997 |
| GB | 883804 | 12/1961 |
| JP | 11-193307 | 7/1999 |
| JP | 11193307 | 7/1999 |
| WO | WO 00/56795 | 9/2000 |

OTHER PUBLICATIONS

B. Ivan, et al., New Telechelic Polymers and Sequential Copolymers by Polyfunctional Initiator-Transfer Agents (Inifers). VII. Synthesis and Characterization of $\alpha,\omega$-Di (hydroxy) polyisobutylene, Journal of Polymer Science: Polymer Chemistry Edition, vol. 18, pp. 3177-3191 (1980).

* cited by examiner

*Primary Examiner*—Fred Teskin
(74) *Attorney, Agent, or Firm*—Kenyon & Kenyon LLP

(57) ABSTRACT

The present invention provides a method for producing a vinyl polymer including the steps of polymerizing a vinyl monomer by atom transfer radical polymerization with a transition metal complex as a polymerization catalyst, and bringing the resultant vinyl polymer into contact with an adsorbent in the presence of an oxidizing agent; the vinyl polymer produced by the method; and a reactive composition susceptible to hydrosilylation containing the vinyl polymer produced by the method and having at least one alkenyl group per molecule.

44 Claims, No Drawings

PROCESS FOR PRODUCING VINYL POLYMER

This application is a 371 national phase application of PCT/JP02/10775 filed on 17 Oct. 2002, claiming priority to JP 2001-318941, filed on 17 Oct. 2001, and JP 2001-339039 filed 05 Nov. 2001, the contents of which are incorporated herein by reference in their entirety.

TECHNICAL FIELD

The present invention relates to a method for producing a vinyl polymer, the vinyl polymer, and a reactive composition susceptible to hydrosilylation.

BACKGROUND ART

Hydrosilylation is one of the most industrially useful reactions, and is used in, for example, functional group conversion and crosslinking reactions. For example, polymers having alkenyl functional groups at the ends of the molecular chains are cured by crosslinking using compounds having hydrosilyl groups as a curing agent. The resultant cured materials have superior heat resistance and durability. Furthermore, polymers having alkenyl groups at the ends of the molecular chains are reacted with compounds including hydrosilyl groups having crosslinkable silyl groups to produce polymers having the crosslinkable silyl groups at the ends of the polymers. Although these hydrosilylation reactions proceed by heating, a hydrosilylation catalyst is added in order to promote the reaction. The hydrosilylation catalysts include a radical initiator such as organic peroxides and azo compounds, and transition metal catalysts. In particular, it is known that transition metal catalysts can promote the hydrosilylation depending on the catalyst content.

On the other hand, living polymerization is generally known as a synthetic method that can synthesize polymers accurately. The living polymerization can not only readily control molecular weights and molecular weight distributions, but also produce polymers whose end structures are definite. Accordingly, the living polymerization is one of the useful methods to introduce functional groups to the ends of the polymers. Recently, some radical polymerization systems in which the living polymerization can also proceed have been found, and living radical polymerization has been studied extensively. In particular, atom transfer radical polymerization yields vinyl polymers having a small molecular weight distribution. In the atom transfer radical polymerization system, examples of the initiator include halogenated organic compounds or sulfonyl halides, and the catalysts include metal complexes containing an element in group 8, group 9, group 10, or group 11 in the periodic table, the element being contained as a central metal. (For example, see Matyjaszewski et al. J. Am. Chem. Soc. 1995, vol. 117, p. 5614, Macromolecules 1995, vol. 28, p. 7901, Science 1996, vol. 272, p. 866, and Sawamoto et al. Macromolecules 1995, vol. 28, p. 1721.)

However, since a transition metal complex used as the polymerization catalyst remains in the vinyl polymer produced by the atom transfer radical polymerization, the above methods cause problems of the coloring of the polymer and environmental safety, and influence the physical property of the polymer. Unfortunately, for example, in vinyl polymers having terminal alkenyl groups produced by the atom transfer radical polymerization, residual catalysts function as anticatalysts of the hydrosilylation reaction. Therefore, the residual catalysts inhibit the hydrosilylation, and a large amount of expensive hydrosilylation catalyst is necessary.

According to Japanese Unexamined Patent Application Publication No. 11-193307, a vinyl polymer produced by the atom transfer radical polymerization is purified by bringing the vinyl polymer into contact with an adsorbent such as aluminum silicate, thereby improving the hydrosilylation activity of the vinyl polymer. However, the improvement in the hydrosilylation activity is not sufficient with respect to the content of the adsorbent. In order to achieve sufficient hydrosilylation activity, the process requires a large amount of adsorbent. Unfortunately, the waste causes a high level of environmental load, and the use of the adsorbent causes an increase in purification cost.

SUMMARY OF THE INVENTION

In order to solve the above problems, it is an object of the present invention to provide a simple, economical, and efficient method for improving the hydrosilylation activity of a vinyl polymer with maintaining the original properties of the vinyl polymer.

The present invention provides a method for producing a vinyl polymer including the steps of polymerizing a vinyl monomer by atom transfer radical polymerization with a transition metal complex as a polymerization catalyst, and bringing the resultant vinyl polymer into contact with an adsorbent in the presence of an oxidizing agent.

The present invention also provides the vinyl polymer produced by the above method.

Furthermore, the present invention provides a reactive composition susceptible to hydrosilylation containing the vinyl polymer produced by the above method and having at least one alkenyl group per molecule.

The present invention will now be described in detail.

DISCLOSURE OF INVENTION

The process for producing a vinyl polymer will now be described.

According to the method of the present invention, a vinyl monomer is polymerized by atom transfer radical polymerization with a transition metal complex as a polymerization catalyst to produce a vinyl polymer.

Atom Transfer Radical Polymerization

The atom transfer radical polymerization will now be described in detail. The atom transfer radical polymerization in the present invention is a kind of living radical polymerization. According to the atom transfer radical polymerization, a vinyl monomer is polymerized by radical polymerization using a halogenated organic compound or a sulfonyl halide as an initiator and a metal complex containing a transition metal as a central metal as a catalyst. Examples of the polymerization are disclosed by Matyjaszewski et al. [Journal of American Chemical Society (J. Am. Chem. Soc.) 1995, vol. 117, p. 5614; Macromolecules 1995, vol. 28, p. 7901; Science 1996, vol. 272, p. 866; PCT Publication Nos. WO96/30421, WO97/18247, WO98/01480, and WO98/40415]; and by Sawamoto et al. [Macromolecules 1995, vol. 28, p. 1721; and Japanese Unexamined Patent Application Publication Nos. 9-208616 and 8-41117].

Examples of the initiator used in the atom transfer radical polymerization include halogenated organic compounds, in particular, halogenated organic compounds having a highly reactive carbon-halogen bond (for example, carbonyl compounds having a halogen atom at the α-position and compounds having a halogen atom at the benzylic position) or sulfonyl halides. Examples of the initiator include
$C_6H_5$—$CH_2X$,
$C_6H_5$—$C(H)(X)CH_3$, and
$C_6H_5$—$C(X)(CH_3)_2$, (wherein $C_6H_5$ represents a phenyl group and X represents a chlorine atom, a bromine atom, or an iodine atom); and
$R^3$—$C(H)(X)$—$CO_2R^4$,
$R^3$—$C(CH_3)(X)$—$CO_2R^4$,
$R^3$—$C(H)(X)$—$C(O)R^4$,
$R^3$—$C(CH_3)(X)$—$C(O)R^4$, and
$R^3$—$C_6H_4$—$SO_2X$ (wherein $R^3$ and $R^4$ independently represent a hydrogen atom, an alkyl group of 1 to 20 carbon atoms, an aryl group of 1 to 20 carbon atoms, or an aralkyl group of 1 to 20 carbon atoms, and X represents a chlorine atom, a bromine atom or an iodine atom).

A vinyl monomer is polymerized by atom transfer radical polymerization using a halogenated organic compound or a sulfonyl halide as an initiator to produce a vinyl polymer having an end structure represented by general formula (1):

$$—C(R^1)(R^2)(X) \quad (1)$$

(wherein $R^1$ and $R^2$ represent a group bonded to an ethylenically unsaturated group of the vinyl monomer, and X represents a chlorine atom, a bromine atom, or an iodine atom).

Halogenated organic compounds or sulfonyl halides having both a functional group that initiate the polymerization and a specific reactive functional group that does not initiate the polymerization may be used as the initiator for the atom transfer radical polymerization. In this case, the resultant vinyl polymer has the specific reactive functional group at one end of the main chain, and has the end structure represented by general formula (1) at the other end of the main chain. Examples of the specific reactive functional group include alkenyl, crosslinkable silyl, hydroxyl, epoxy, amino, and amido groups. Other functional groups can be introduced in the vinyl polymer by utilizing the reactivity of these reactive functional groups, through one or several reaction steps.

The halogenated organic compound having an alkenyl group is not limited and includes, for example, a compound represented by general formula (2):

$$R^6R^7C(X)—R^8—R^9—C(R^5)=CH^2 \quad (2)$$

(wherein $R^5$ represents a hydrogen atom or a methyl group; each of $R^6$ and $R^7$ represents a hydrogen atom, a monovalent alkyl group of 1 to 20 carbon atoms, an aryl group of 1 to 20 carbon atoms, an aralkyl group of 1 to 20 carbon atoms, or a group that forms a cyclic structure by bonding each other at their ends; $R^8$ represents —C(O)O— (an ester group), —C(O)— (a keto group), or an o-, m-, p-phenylene group; $R^9$ represents a direct bond, or a divalent organic group of 1 to 20 carbon atoms, the divalent organic group may include at least one ether bond; and X represents a chlorine atom, a bromine atom, or an iodine atom).

Examples of the substituents $R^6$ and $R^7$ include a hydrogen atom, methyl group, ethyl group, n-propyl group, isopropyl group, butyl group, pentyl group, and hexyl group. $R^6$ and $R^7$ may bond to each other at their ends to form a cyclic structure.

Examples of the halogenated organic compound represented by general formula (2), the halogenated organic compound having an alkenyl group include $XCH_2C(O)O(CH_2)_nCH=CH_2$,
$H_3CC(H)(X)C(O)O(CH_2)_nCH=CH_2$,
$(H_3C)_2C(X)C(O)O(CH_2)_nCH=CH_2$,
$CH_3CH_2C(H)(X)C(O)O(CH_2)_nCH=CH_2$, and

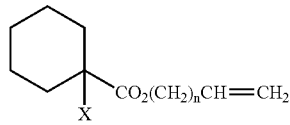

(wherein X represents a chlorine atom, a bromine atom, or an iodine atom, and n represents an integer of 0 to 20);
$XCH_2C(O)O(CH_2)_nO(CH_2)_mCH=CH_2$,
$H_3CC(H)(X)C(O)O(CH_2)_nO(CH_2)_mCH=CH_2$,
$(H_3C)_2C(X)C(O)O(CH_2)_nO(CH_2)_mCH=CH_2$,
$CH_3CH_2C(H)(X)C(O)O(CH_2)_nO(CH_2)_mCH=CH_2$, and

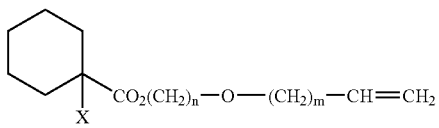

(wherein X represents a chlorine atom, a bromine atom, or an iodine atom, n represents an integer of 0 to 20, and m represents an integer of 0 to 20);
o, m, p-$XCH_2$—$C_6H_4$—$(CH_2)_n$—$CH=CH_2$,
o, m, p-$CH_3C(H)(X)$—$C_6H_4$—$(CH_2)_n$—$CH=CH_2$, and
o, m, p-$CH_3CH_2C(H)(X)$—$C_6H_4$—$(CH_2)_n$—$CH=CH_2$, (wherein X represents a chlorine atom, a bromine atom, or an iodine atom, and n represents an integer of 0 to 20);
o, m, p-$XCH_2$—$C_6H_4$—$(CH_2)_n$—O—$(CH_2)_m$—$CH=CH_2$,
o, m, p-$CH_3C(H)(X)$—$C_6H_4$—$(CH_2)_n$—O—$(CH_2)_m$—$CH=CH_2$, and
o, m, p-$CH_3CH_2C(H)(X)$—$C_6H_4$—$(CH_2)_n$—O—$(CH_2)_m$—$CH=CH_2$, (wherein X represents a chlorine atom, a bromine atom, or an iodine atom, n represents an integer of 0 to 20, and m represents an integer of 0 to 20);
o, m, p-$XCH_2$—$C_6H_4$—O—$(CH_2)_n$—$CH=CH_2$,
o, m, p-$CH_3C(H)(X)$—$C_6H_4$—O—$(CH_2)_n$—$CH=CH_2$, and
o, m, p-$CH_3CH_2C(H)(X)$—$C_6H_4$—O—$(CH_2)_n$—$CH=CH_2$, (wherein X represents a chlorine atom, a bromine atom, or an iodine atom and n represents an integer of 0 to 20); and
o, m, p-$XCH_2$—$C_6H_4$—O—$(CH_2)_n$—O—$(CH_2)_m$—$CH=CH_2$,
o, m, p-$CH_3C(H)(X)$—$C_6H_4$—O—$(CH_2)_n$—O—$(CH_2)_m$—$CH=CH_2$, and
o, m, p-$CH_3CH_2C(H)(X)$—$C_6H_4$—O—$(CH_2)_n$—O—$(CH_2)_m$—$CH=CH_2$, (wherein X represents a chlorine atom, a bromine atom, or an iodine atom, n represents an integer of 0 to 20, and m represents an integer of 0 to 20).

Examples of the halogenated organic compound having an alkenyl group further include compounds represented by general formula (3):

$$H_2C=C(R^5)—R^9—C(R^6)(X)—R^{10}—R^7 \quad (3)$$

(wherein $R^5$, $R^6$, $R^7$, $R^9$, and X are as defined above, $R^{10}$ represents a direct bond, C(O)O— (an ester group), —C(O)— (a keto group), or an o-, m-, p-phenylene group).

$R^8$ represents a direct bond or a divalent organic group of 1 to 20 carbon atoms (the divalent organic group may include at least one ether bond). When $R^8$ is a direct bond, a vinyl group is bonded to a carbon that is bonded to a halogen. That is, the compound is an allyl halide. In this case, the bond between the carbon and the halogen is activated by the adjacent vinyl group. Therefore, $R^{10}$ is not always a C(O)O group or a phenylene group, and may be a direct bond. When $R^9$ is not a direct bond, $R^{10}$ is preferably a C(O)O group, a C(O) group, or a phenylene group in order to activate the bond between the carbon and the halogen.

Examples of the compound represented by general formula (3) include
$CH_2=CHCH_2X$,
$CH_2=C(CH_3)CH_2X$,
$CH_2=CHC(H)(X)CH_3$, $CH_2=C(CH_3)C(H)(X)CH_3$,
$CH_2=CHC(X)(CH_3)_2$, $CH_2=CHC(H)(X)C_2H_5$,
$CH_2=CHC(H)(X)CH(CH_3)_2$,
$CH_2=CHC(H)(X)C_6H_5$, $CH_2=CHC(H)(X)CH_2C_6H_5$,
$CH_2=CHCH_2C(H)(X)-CO_2R$,
$CH_2=CH(CH_2)_2C(H)(X)-CO_2R$,
$CH_2=CH(CH_2)_3C(H)(X)-CO_2R$,
$CH_2=CH(CH_2)_8C(H)(X)-CO_2R$,
$CH_2=CHCH_2C(H)(X)-C_6H_5$,
$CH_2=CH(CH_2)_2C(H)(X)-C_6H_5$, and
$CH_2=CH(CH_2)_3C(H)(X)-C_6H_5$, (wherein X represents a chlorine atom, a bromine atom or an iodine atom, R represents an alkyl group of 1 to 20 carbon atoms, an aryl group of 1 to 20 carbon atoms, or an aralkyl group of 1 to 20 carbon atoms).

Examples of the sulfonyl halide having an alkenyl group include
o-, m-, p-$CH_2=CH-(CH_2)_n-C_6H_4-SO_2X$, and
o-, m-, p-$CH_2=CH-(CH_2)_n-O-C_6H_4-SO_2X$, (wherein X represents a chlorine atom, a bromine atom, or an iodine atom, and n represents an integer of 0 to 20).

The halogenated organic compound having a crosslinkable silyl group is not limited. Examples of the compound include the compound represented by general formula (4):

$$R^6R^7C(X)-R^8-R^9-C(H)(R^5)CH_2-[(Si(R^{11})_{2-b}(Y)_bO]_m-Si(R^{12})_{3-a}(Y)_a \quad (4)$$

(wherein $R^5$, $R^6$, $R^7$, $R^8$, $R^9$, and X are as defined above; each of $R^{11}$ and $R^{12}$ represents an alkyl group of 1 to 20 carbon atoms, an aryl group of 1 to 20 carbon atoms, or an aralkyl group of 1 to 20 carbon atoms or a triorganosiloxy group represented by $(R')_3SiO$— (wherein R' represents a monovalent hydrocarbon group of 1 to 20 carbon atoms and the three R's may be the same or different); when the number of $R^{11}$s or $R^{12}$s is two or more, each of the $R^{11}$ or $R^{12}$ may be the same or different; Y represents a hydroxyl group or a hydrolyzable group; when the number of Ys is two or more, each of Y may be the same or different; a represents 0, 1, 2, or 3, b represents 0, 1, or 2, and m represents an integer of 0 to 19, wherein $a+mb \geq 1$).

Examples of the compounds represented by general formula (4) include
$XCH_2C(O)O(CH_2)_nSi(OCH_3)_3$,
$CH_3C(H)(X)C(O)O(CH_2)_nSi(OCH_3)_3$,
$(CH_3)_2C(X)C(O)O(CH_2)_nSi(OCH_3)_3$,
$XCH_2C(O)O(CH_2)_nSi(CH_3)(OCH_3)_2$,
$CH_3C(H)(X)C(O)O(CH_2)_nSi(CH_3)(OCH_3)_2$, and
$(CH_3)_2C(X)C(O)O(CH_2)_nSi(CH_3)(OCH_3)_2$, (wherein X represents a chlorine atom, a bromine atom, or an iodine atom and n represents an integer of 0 to 20);
$XCH_2C(O)O(CH_2)_nO(CH_2)_mSi(OCH_3)_3$,
$H_3CC(H)(X)C(O)O(CH_2)_nO(CH_2)_mSi(OCH_3)_3$,
$(H_3C)_2C(X)C(O)O(CH_2)_nO(CH_2)_mSi(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3)_2$,
$H_3CC(H)(X)C(O)O(CH_2)_nO(CH_2)_m-Si(CH_3)(OCH_3)_2$,
$(H_3C)_2C(X)C(O)O(CH_2)_nO(CH_2)_m-Si(CH_3)(OCH_3)_2$, and
$CH_3CH_2C(H)(X)C(O)O(CH_2)_nO(CH_2)_m-Si(CH_3)(OCH_3)_2$, (wherein X represents a chlorine atom, a bromine atom, or an iodine atom, n represents an integer of 0 to 20, and m represents an integer of 0 to 20); and
o, m, p-$XCH_2-C_6H_4-(CH_2)_2Si(OCH_3)_3$,
o, m, p-$CH_3C(H)(X)-C_6H_4-(CH_2)_2Si(OCH_3)_3$,
o, m, p-$CH_3CH_2C(H)(X)-C_6H_4-(CH_2)_2Si(OCH_3)_3$,
o, m, p-$XCH_2-C_6H_4-(CH_2)_3Si(OCH_3)_3$,
o, m, p-$CH_3C(H)(X)-C_6H_4-(CH_2)_3Si(OCH_3)_3$,
o, m, p-$CH_3CH_2C(H)(X)-C_6H_4-(CH_2)_3Si(OCH_3)_3$,
o, m, p-$XCH_2-C_6H_4-(CH_2)_2-O-(CH_2)_3Si(OCH_3)_3$,
o, m, p-$CH_3C(H)(X)-C_6H_4-(CH_2)_2-O-(CH_2)_3Si(OCH_3)_3$,
o, m, p-$CH_3CH_2C(H)(X)-C_6H_4-(CH_2)_2-O-(CH_2)_3Si(OCH_3)_3$,
o, m, p-$XCH_2-C_6H_4-O-(CH_2)_3Si(OCH_3)_3$,
o, m, p-$CH_3C(H)(X)-C_6H_4-O-(CH_2)_3Si(OCH_3)_3$,
o, m, p-$CH_3CH_2C(H)(X)-C_6H_4-O-(CH_2)_3-Si(OCH_3)_3$,
o, m, p-$XCH_2-C_6H_4-O-(CH_2)_2-O-(CH_2)_3-Si(OCH_3)_3$,
o, m, p-$CH_3C(H)(X)-C_6H_4-O-(CH_2)_2-O-(CH_2)_3Si(OCH_3)_3$, and
o, m, p-$CH_3CH_2C(H)(X)-C_6H_4-O-(CH_2)_2-O-(CH_2)_3Si(OCH_3)_3$, (wherein X represents a chlorine atom, a bromine atom, or an iodine atom).

The halogenated organic compound having a crosslinkable silyl group further includes the compound represented by general formula (5):

$$(R^{12})_{3-a}(Y)_aSi-[OSi(R^{11})_{2-b}(Y)_b]_m-CH_2-C(H)(R^5)-R^9-C(R^6)(X)-R^{10}-R^7 \quad (5)$$

(wherein $R^5$, $R^7$, $R^8$, $R^9$, $R^{10}$, $R^{11}$, $R^{12}$, a, b, m, X, and Y are as defined above).

Examples of the compound include
$(CH_3O)_3SiCH_2CH_2C(H)(X)C_6H_5$,
$(CH_3O)_2(CH_3)SiCH_2CH_2C(H)(X)C_6H_5$,
$(CH_3O)_3Si(CH_2)_2C(H)(X)-CO_2R$,
$(CH_3O)_2(CH_3)Si(CH_2)_2C(H)(X)-CO_2R$,
$(CH_3O)_3Si(CH_2)_3C(H)(X)-CO_2R$,
$(CH_3O)_2(CH_3)Si(CH_2)_3C(H)(X)-CO_2R$,
$(CH_3O)_3Si(CH_2)_4C(H)(X)-CO_2R$,
$(CH_3O)_2(CH_3)Si(CH_2)_4C(H)(X)-CO_2R$,
$(CH_3O)_3Si(CH_2)_9C(H)(X)-CO_2R$,
$(CH_3O)_2(CH_3)Si(CH_2)_9C(H)(X)-CO_2R$,
$(CH_3O)_3Si(CH_2)_3C(H)(X)-C_6H_5$,
$(CH_3O)_2(CH_3)Si(CH_2)_3C(H)(X)-C_6H_5$,
$(CH_3O)_3Si(CH_2)_4C(H)(X)-C_6H_5$, and
$(CH_3O)_2(CH_3)Si(CH_2)_4C(H)(X)-C_6H_5$, (wherein X represents a chlorine atom, a bromine atom or an iodine atom, R represents an alkyl group of 1 to 20 carbon atoms, an aryl group of 1 to 20 carbon atoms, or an aralkyl group of 1 to 20 carbon atoms).

The halogenated organic compound having a hydroxyl group or the sulfonyl halide having a hydroxyl group is not limited. Examples of the compound include:

HO—(CH$_2$)$_n$—OC(O)C(H)(R)(X)

(wherein X represents a chlorine atom, a bromine atom, or an iodine atom, R represents a hydrogen atom, an alkyl group of 1 to 20 carbon atoms, an aryl group of 1 to 20 carbon atoms, or an aralkyl group of 1 to 20 carbon atoms, and n represents an integer of 0 to 20).

The halogenated organic compound having an amino group or the sulfonyl halide having an amino group is not limited. Examples of the compound include:

H$_2$N—(CH$_2$)$_n$—OC(O)C(H)(R)(X)

(wherein X represents a chlorine atom, a bromine atom, or an iodine atom, R represents a hydrogen atom, an alkyl group of 1 to 20 carbon atoms, an aryl group of 1 to 20 carbon atoms, or an aralkyl group of 1 to 20 carbon atoms, and n represents an integer of 0 to 20).

The halogenated organic compound having an epoxy group or the sulfonyl halide having an epoxy group is not limited. Examples of the compound include:

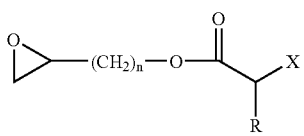

(wherein X represents a chlorine atom, a bromine atom, or an iodine atom, R represents a hydrogen atom, an alkyl group of 1 to 20 carbon atoms, an aryl group of 1 to 20 carbon atoms, or an aralkyl group of 1 to 20 carbon atoms, and n represents an integer of 0 to 20).

In order to produce a polymer having two or more reactive functional groups per molecule, the initiator is preferably a halogenated organic compound or a sulfonyl halide having two or more initiation points. Examples of the compound include:

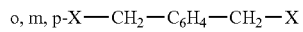
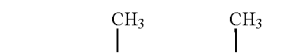
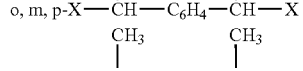

(wherein C$_6$H$_4$ represents a phenylene group and X represents a chlorine atom, a bromine atom, or an iodine atom);

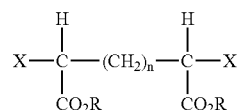 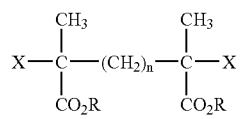

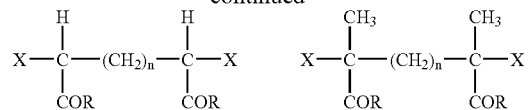

(wherein R represents an alkyl group of 1 to 20 carbon atoms, an aryl group of 1 to 20 carbon atoms, or an aralkyl group of 1 to 20 carbon atoms, n represents an integer of 0 to 20, and X represents a chlorine atom, a bromine atom, or an iodine atom);

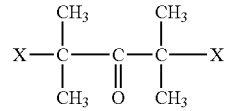 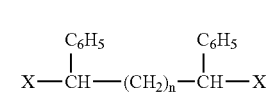

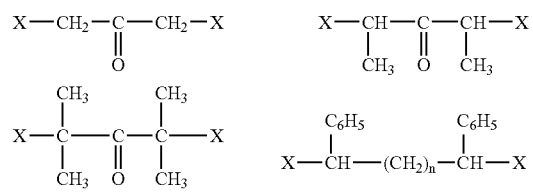

(wherein, X represents a chlorine atom, a bromine atom, or an iodine atom and n represents an integer of 0 to 20);

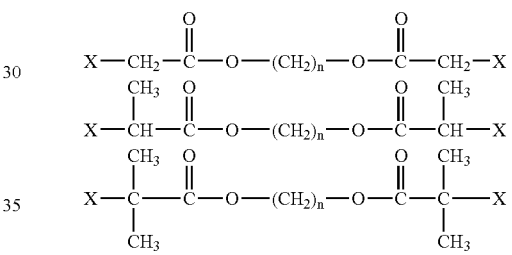

(wherein, n represents an integer of 0 to 20 and X represents a chlorine atom, a bromine atom, or an iodine atom); and

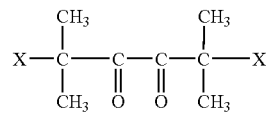

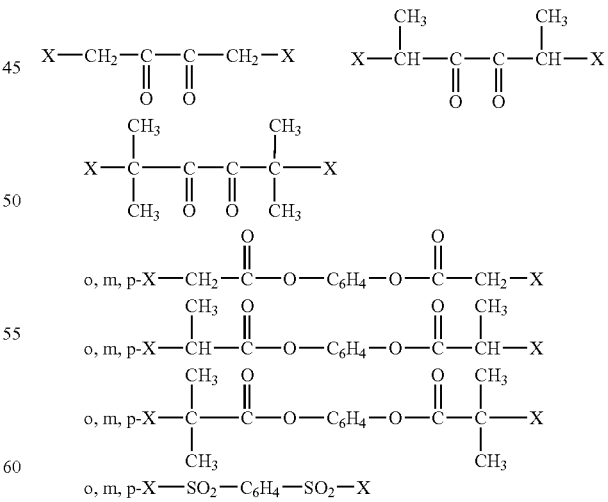

(wherein, X represents a chlorine atom, a bromine atom, or an iodine atom).

Although the transition metal complex used as the polymerization catalyst is not limited, the transition metal complex preferably includes a metal complex containing an element in group 7, group 8, group 9, group 10, or group 11 in the periodic table, the element being contained as a central metal. More preferably, the transition metal complex includes a complex of zero-valent copper, monovalent copper, divalent ruthenium, divalent iron, or divalent nickel. In particular, a copper complex is preferable. Examples of the monovalent copper compound include cuprous chloride, cuprous bromide, cuprous iodide, cuprous cyanide, cuprous oxide, and cuprous perchlorate. When the copper compounds are used, a ligand, for example, 2,2'-bipyridyl or its derivative, 1,10-phenanthroline or its derivative, or a polyamine such as diamine, e.g. tetramethylethylenediamine, a triamine, e.g. pentamethyldiethylenetriamine, or hexamethyl tris (2-aminoethyl) amine is added in order to enhance the catalytic activity. Tris triphenylphosphine complex containing divalent ruthenium chloride ($RuCl_2(PPh_3)_3$) is also preferable as the catalyst. When ruthenium compounds are used as the catalyst, aluminum alkoxides are added as an activating agent. Furthermore, bis triphenylphosphine complex containing divalent iron ($FeCl_2(PPh_3)_2$), bis triphenylphosphine complex containing divalent nickel ($NiCl_2(PPh_3)_2$), and bis tributylphosphine complex containing divalent nickel ($NiBr_2(PBu_3)_2$) are also preferable as the catalyst.

The vinyl monomer used in this polymerization is not limited. Examples of the vinyl monomer include (meth) acrylic monomers such as (meth)acrylic acid, methyl (meth)acrylate, ethyl (meth)acrylate, n-propyl (meth)acrylate, isopropyl (meth)acrylate, n-butyl (meth)acrylate, iso-butyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth) acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyl oxypropyl) trimethoxy silane, (meth)acrylic acid ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, and 2-perfluorohexadecylethyl (meth)acrylate; styrenic monomers such as styrene, vinyltoluene, α-methyl styrene, chlorostyrene, styrenesulfonic acid, and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, monoalkyl maleate, and dialkyl maleate; fumaric acid, monoalkyl fumarate, and dialkyl fumarate; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, and allyl alcohol. These monomers may be used alone or used in combination to copolymerize. In terms of the physical properties of the product, the styrene monomers and the (meth)acrylic monomers are preferably used. In particular, acrylate monomers and methacrylate monomers are preferably used, more preferably, acrylate monomers are used, and most preferably, butyl acrylate is used. According to the present invention, the preferable monomers may be copolymerized, furthermore, may be subjected to block copolymerization with other monomers. In this case, the content of the preferable monomers is preferably 40 percent by weight. In the above expression, for example, (meth)acrylic acid represents acrylic acid and/or methacrylic acid.

The polymerization reaction may be performed in a solvent-free system or in various solvents. The kind of the solvent is not limited. Examples of the solvent include hydrocarbons such as benzene and toluene; ethers such as diethyl ether, tetrahydrofuran, diphenyl ether, anisole, and dimethoxybenzene; halogenated hydrocarbons, such as methylene chloride, chloroform, and chlorobenzene; ketones such as acetone, methyl ethyl ketone, and methyl isobutyl ketone; alcohols such as methanol, ethanol, propanol, isopropyl alcohol, n-butyl alcohol, and tert-butyl alcohol; nitrites such as acetonitrile, propionitrile, and benzonitrile; esters such as ethyl acetate and butyl acetate; carbonates such as ethylene carbonate and propylene carbonate; and amides such as N,N-dimethylformamide and N,N-dimethylacetamide. These solvents may be used alone or in combination. Furthermore, the polymerization may be performed in an emulsion system or in a system using a supercritical fluid $CO_2$ as a medium.

Although the temperature during the polymerization is not limited, the polymerization is generally performed in the range of 0° C. to 200° C., and preferably in the range of room temperature to 150° C.

Vinyl Polymer

The vinyl polymer according to the present invention will now be described in detail.

The molecular weight distribution of the vinyl polymer, i.e., the ratio of the weight average molecular weight to the number average molecular weight measured by gel permeation chromatography (GPC), is not limited. The molecular weight distribution of the vinyl polymer is generally less than 1.8, preferably less than 1.7, more preferably less than 1.6, in particular, less than 1.5, still more preferably less than 1.4, and most preferably less than 1.3. According to the GPC in the present invention, generally, chloroform is used as a mobile phase, and a polystyrene gel column is used for the measurement. For example, the number average molecular weight can be determined with a polystyrene standard.

Although the number average molecular weight of the vinyl polymer is not limited, the number average molecular weight is preferably in the range of 500 to 1,000,000, more preferably, 1,000 to 100,000. A significantly low molecular weight does not exhibit the original properties of the vinyl polymer, whereas a significantly high molecular weight precludes the handling.

The vinyl polymer may have a reactive functional group in the molecule. The vinyl polymer may have the reactive functional group either at a side chain or an end of the molecular chain. The reactive functional group is not limited. Examples of the reactive functional group include alkenyl, hydroxyl, amino, crosslinkable silyl, and polymerizable carbon-carbon double bond groups. The reactive functional group can be converted into other appropriate functional group through one or several steps. For example, in the present invention, a vinyl polymer having an alkenyl group is synthesized by converting a reactive functional group such as hydroxyl group.

Vinyl Polymer Having an Alkenyl Group

The vinyl polymer having an alkenyl group will now be described in detail. The vinyl polymer having an alkenyl group can be used as a component of a reactive composition susceptible to hydrosilylation. For example, a vinyl polymer having at least one alkenyl group in the molecule is crosslinked by hydrosilylation using a compound having a hydrosilyl group as a curing agent to produce a cured material. A vinyl polymer having at least one alkenyl group in the molecule is subjected to hydrosilylation with a hydrosilane compound having a crosslinkable functional group to produce a vinyl polymer having the crosslinkable functional group.

The vinyl polymer having an alkenyl group is prepared by atom transfer radical polymerization.

Although the alkenyl group in the present invention is not limited, the alkenyl group is preferably represented by general formula (6):

(wherein $R^{13}$ represents a hydrogen atom or an organic group of 1 to 20 carbon atoms).

In general formula (6), $R^{13}$ represents a hydrogen atom or an organic group of 1 to 20 carbon atoms. Although the organic group of 1 to 20 carbon atoms is not limited, examples of the organic group of 1 to 20 carbon atoms preferably include an alkyl group of 1 to 20 carbon atoms, an aryl group of 6 to 20 carbon atoms, and an aralkyl group of 7 to 20 carbon atoms. Examples of the organic group include
—(CH$_2$)$_n$—CH$_3$, —CH(CH$_3$)—(CH$_2$)$_n$—CH$_3$, —CH(CH$_2$CH$_3$)—(CH$_2$)$_n$—CH$_3$,
—CH(CH$_2$CH$_3$)$_2$, —C(CH$_3$)$_2$—(CH$_2$)$_n$—CH$_3$, —C(CH$_3$)(CH$_2$CH$_3$)—(CH$_2$)$_n$—CH$_3$,
—C$_6$H$_5$, —C$_6$H$_5$(CH$_3$), —C$_6$H$_5$(CH$_3$)$_2$, —(CH$_2$)$_n$—C$_6$H$_5$, —(CH$_2$)$_n$—C$_6$H$_5$(CH$_3$), and —(CH$_2$)$_n$—C$_6$H$_5$(CH$_3$)$_2$ (wherein n represents an integer of 0 or more, but the total number of carbons in each organic group is 20 or less).

Among the examples, $R^{13}$ is more preferably a hydrogen atom or a methyl group.

The alkenyl group is not limited. However, it is not preferable that the alkenyl group in the vinyl polymer is activated by a carbonyl group, an alkenyl group, or an aromatic ring, all of which are conjugated with the carbon-carbon double bond in the alkenyl group in the vinyl polymer.

Although the bond between the alkenyl group and the main chain of the polymer is not limited, the alkenyl group and the main chain of the polymer is preferably bonded through, for example, a carbon-carbon bond, an ester bond, an ester bond, a carbonate bond, an amide bond, or a urethane bond.

The vinyl polymer may include the alkenyl groups at any position of the molecule. However, if the cured material of the reactive composition susceptible to hydrosilylation according to the present invention especially requires an elastic property, at least one of the alkenyl groups is preferably located at one end of the molecular chain because this molecular chain structure can increase the molecular weight between crosslinks that greatly effects on the rubber elasticity. More preferably, the vinyl polymer includes all the alkenyl groups at the ends of the molecular chain. That is, all the alkenyl groups are, more preferably, located at the ends of the molecule.

Although the number of the alkenyl group is not limited, the number of the alkenyl group is generally at least 1, preferably, at least 1.2, and more preferably, at least 1.5 on average in order to produce a highly crosslinked cured material.

Methods for producing the vinyl polymer having an alkenyl group will now be described in detail, which do not intend to limit the scope of the present invention.

(A-a) A method for synthesizing a vinyl polymer by atom transfer radical polymerization including the step of reacting, for example, a compound represented by general formula (9) as a second monomer, the compound having both a polymerizable alkenyl group and an alkenyl group having low polymerizability per molecule:

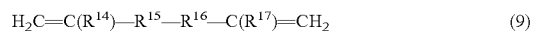

(wherein $R^{14}$ represents a hydrogen atom or a methyl group; $R^{15}$ represents —C(O)O— or an o-, m-, p-phenylene group; $R^{16}$ represents a direct bond, or a divalent organic group of 1 to 20 carbon atoms, the divalent organic group may include at least one ether bond; and $R^{17}$ represents a hydrogen atom or an organic group of 1 to 20 carbon atoms).

In general formula (9), $R^{17}$ represents a hydrogen atom or an organic group of 1 to 20 carbon atoms. Although the organic group of 1 to 20 carbon atoms is not limited, examples of the organic group of 1 to 20 carbon atoms preferably include an alkyl group of 1 to 20 carbon atoms, an aryl group of 6 to 20 carbon atoms, and an aralkyl group of 7 to 20 carbon atoms. Examples of the organic group include
—(CH$_2$)$_n$—CH$_3$, —CH(CH$_3$)—(CH$_2$)$_n$—CH$_3$, —CH(CH$_2$CH$_3$)—(CH$_2$)$_{CH3}$,
—CH(CH$_2$CH$_3$)$_2$, —C(CH$_3$)$_2$—(CH$_2$)$_n$—CH$_3$, —C(CH$_3$)(CH$_2$CH$_3$)—(CH$_2$)$_n$—CH$_3$,
—C$_6$H$_5$, —C$_6$H$_5$(CH$_3$), —C$_6$H$_5$(CH$_3$)$_2$, —(CH$_2$)$_n$—C$_6$H$_5$, —(CH$_2$)$_n$—C$_6$H$_5$(CH$_3$), and —(CH$_2$)$_n$—C$_6$H$_5$(CH$_3$)$_2$ (wherein n represents an integer of 0 or more, but the total number of carbons in each organic group is 20 or less).

Among the examples, $R^{17}$ is more preferably a hydrogen atom or a methyl group.

The compound having both a polymerizable alkenyl group and an alkenyl group having low polymerizability per molecule may be reacted at any time during the polymerization. If a cured material produced by curing a vinyl polymer requires an elastic property, the compound is preferably reacted as the second monomer at the end of the polymerization or after the reaction of the predetermined monomer.

(A-b) A method for synthesizing a vinyl polymer by atom transfer radical polymerization including the step of reacting a compound having at least two carbon-carbon double bonds having low polymerizability, for example, 1,5-hexadiene, 1,7-octadiene and 1,9-decadiene, during or after the polymerization.

(A-c) A method including the step of replacing a halogen atom with an alkenyl group by reacting a vinyl polymer produced by atom transfer radical polymerization and having at least one highly reactive carbon-halogen terminal bond with an organometallic compound having an alkenyl group such as an organotin, e.g. allyltributyltin or allyltrioctyltin.

(A-d) A method including the step of replacing a halogen atom with an alkenyl group by reacting a vinyl polymer produced by atom transfer radical polymerization and having at least one highly reactive carbon-halogen bond at ends of the polymer with a stabilized carbanion having an alkenyl group, represented by general formula (10):

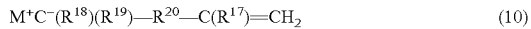  (10)

(wherein $R^{17}$ is as defined above; both $R^{18}$ and $R^{19}$ represent electron attractive groups that stabilize the carbanion $C^-$, or one of $R^{18}$ and $R^{19}$ represents the electron attractive group and the other represents a hydrogen atom, an alkyl group of 1 to 20 carbon atoms or a phenyl group; $R^{20}$ represents a direct bond or a divalent organic group of 1 to 20 carbon atoms, the divalent organic group may include at least one ether bond; and M+represents an alkali metal ion or a quaternary ammonium ion).

Examples of the electron attractive groups $R^{18}$ and $R^{19}$ include —$CO_2R$ (ester group), —C(O)R (keto group), —$CON(R_2)$ (amido group), —COSR (thioester group), —CN (nitrile group), and —$NO_2$ (nitro group). In particular, —$CO_2R$ (ester group), —C(O)R (keto group) and —CN (nitrile group) are preferable. The substituent R represents an alkyl group of 1 to 20 carbon atoms, an aryl group of 6 to 20 carbon atoms, or an aralkyl group of 7 to 20 carbon atoms. The substituent R is preferably an alkyl group of 1 to 10 carbon atoms or a phenyl group.

(A-e) A method including the steps of preparing an enolate anion by reacting a vinyl polymer having at least one highly reactive carbon-halogen terminal bond produced by atom transfer radical polymerization with a metal such as zinc or an organometallic compound; and reacting the resultant product with an electrophilic compound having an alkenyl group, for example, a compound including an alkenyl group having a leaving group such as a halogen atom or acetyl group, a carbonyl compound having an alkenyl group, an isocyanate compound having an alkenyl group, or an acid halide having an alkenyl group.

(A-f) A method including the step of replacing a halogen atom with an alkenyl group by reacting a vinyl polymer produced by atom transfer radical polymerization and having at least one highly reactive carbon-halogen terminal bond with an oxyanion having an alkenyl group or a carboxylate anion having an alkenyl group, for example, represented by general formula (11) or (12):

  (11)

(wherein $R^{17}$ and $M^+$ are as defined above, $R^{21}$ represents a divalent organic group of 1 to 20 carbon atoms, the divalent organic group may include at least one ether bond); or

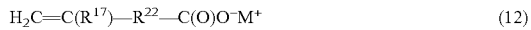  (12)

(wherein $R^{17}$ and $M^+$ are as defined above, $R^{22}$ represents a direct bond or a divalent organic group of 1 to 20 carbon atoms, the divalent organic group may include at least one ether bond).

In terms of ready control of the reaction, among Methods (A-a) to (A-f), Methods (A-b) and (A-f) are preferable. Methods (A-b) and (A-f) will now be described in detail.

Method for Adding Diene Compound [Method (A-b)]

Method (A-b) includes the step of reacting a vinyl polymer produced by atom transfer radical polymerization of a vinyl monomer with a compound having at least two alkenyl groups having low polymerizability (hereinafter referred to as diene compound).

These at least two alkenyl groups in the diene compound may be the same or different. The alkenyl groups may be either terminal alkenyl groups [$CH_2$=C(R)—R'; wherein R represents a hydrogen atom or an organic group of 1 to 20 carbon atoms, R' represents an organic group of 1 to 20 carbon atoms, and R and R' may bond to each other at their ends to form a cyclic structure.] or internal alkenyl groups [R'—C(R)=C(R)—R'; wherein R represents a hydrogen atom or an organic group of 1 to 20 carbon atoms, R' represents an organic group of 1 to 20 carbon atoms, and two Rs (or two R's) may be the same or different, any two substituents of the two Rs and two R's may bond to each other at their ends to form a cyclic structure.]. The terminal alkenyl groups are more preferable. R represents a hydrogen atom or an organic group of 1 to 20 carbon atoms. The organic group of 1 to 20 carbon atoms preferably includes an alkyl group of 1 to 20 carbon atoms, an aryl group of 6 to 20 carbon atoms, and an aralkyl group of 7 to 20 carbon atoms. More preferably, R is a hydrogen atom or a methyl group.

Among the alkenyl groups of the diene compound, at least two alkenyl groups may be conjugated.

Examples of the diene compound include isoprene, piperylene, butadiene, myrcene, 1,5-hexadiene, 1,7-octadiene, 1,9-decadiene, and 4-vinyl-1-cyclohexene. In particular, 1,5-hexadiene, 1,7-octadiene, and 1,9-decadiene are preferable.

A vinyl monomer is subjected to living radical polymerization, and the resultant polymer is isolated from the polymerization system. Subsequently, the isolated polymer and the diene compound may be subjected to radical reaction to produce a desired vinyl polymer having terminal alkenyl groups. Alternatively, the diene compound may be added to the polymerization reaction system during polymerization or after the polymerization and, preferably, at the end of the polymerization reaction or after the reaction of the predetermined vinyl monomer, due to simplicity of the reaction.

The additive content of the diene compound must be controlled depending on the radical reactivity of the alkenyl groups in the diene compound. When the two alkenyl groups are significantly different in reactivity, the content of the diene compound may be the equivalent or a slight excess of the propagating ends in the polymer. On the other hand, when the two alkenyl groups have the same or similar reactivity, both the two alkenyl groups are reacted and the polymer ends are subjected to coupling. Therefore, the content of the diene compound is preferably larger than the content of the propagating ends in the polymer. The additive content of the diene compound is preferably at least 1.5 times, more preferably, at least 3 times, and most preferably, at least 5 times of the propagating ends in the polymer.

Nucleophilic Substitution Method [Method (A-f)]

Method (A-f) includes the step of replacing a halogen atom with an alkenyl group by reacting a vinyl polymer produced by atom transfer radical polymerization and having at least one highly reactive carbon-halogen terminal bond with an oxyanion having an alkenyl group or a carboxylate anion having an alkenyl group.

The oxyanion having an alkenyl group or the carboxylate anion having an alkenyl group is not limited. Examples of the oxyanions or carboxylate anions are represented by general formula (11) or (12):

  (11)

(wherein $R^{17}$ and $M^+$ are as defined above, $R^{21}$ represents a divalent organic group of 1 to 20 carbon atoms, the divalent organic group may include at least one ether bond); or $$H_2C=C(R^{17})-R^{22}-C(O)O^-M^+ \qquad (12)$$

(wherein $R^{17}$ and $M^+$ are as defined above, $R^{22}$ represents a direct bond or a divalent organic group of 1 to 20 carbon atoms, the divalent organic group may include at least one ether bond).

Examples of the oxyanion or carboxylate anion include salts of alkenyl alcohols such as allyl alcohol; salts of allyloxy alcohols such as ethylene glycol monoallylether; salts of phenolic hydroxyl groups containing alkenyl groups such as allyl phenol and allyloxy phenol; carboxylates containing alkenyl groups such as 10-undecylenic acid, 4-pentenoic acid, and vinyl acetate.

$M^+$ is a counter cation. Examples of the counter cation $M^+$ include alkali metal ions such as lithium ion, sodium ion, and potassium ion; and quaternary ammonium ions. Examples of the quaternary ammonium ions include tetramethylammonium ion, tetraethylammonium ion, tetrabenzylammonium ion, trimethyldodecylammonium ion, tetrabutylammonium ion, and dimethylpiperidinium ion. Preferably, the counter cation $M^+$ is sodium ion, and potassium ion.

The content of the oxyanion or carboxylate anion may be excess to the halogen atoms in the vinyl polymer, and is preferably, 1 to 5 equivalents, more preferably, 1 to 2 equivalents, and most preferably, 1.0 to 1.2 equivalents of the halogen atoms in the vinyl polymer.

Although solvents used for this reaction are not limited, solvents having relatively high polarity are preferable. Examples of the solvent include ethers such as diethyl ether, tetrahydrofuran, diphenyl ether, anisole, and dimethoxybenzene; halogenated hydrocarbons, such as methylene chloride and chloroform; ketones such as acetone, methyl ethyl ketone, and methyl isobutyl ketone; alcohols such as methanol, ethanol, propanol, isopropyl alcohol, n-butyl alcohol, and tert-butyl alcohol; nitrites such as acetonitrile, propionitrile, and benzonitrile; esters such as ethyl acetate and butyl acetate; carbonates such as ethylene carbonate and propylene carbonate; and amides such as dimethylformamide, dimethylacetamide, and hexamethylphosphoric triamide; and sulfoxides such as dimethylsulfoxide. These solvents may be used alone or in combination. In particular, polar solvents, for example, acetone, dimethylsulfoxide, dimethylformamide, dimethylacetamide, hexamethylphosphoric triamide, and acetonitrile are preferable. Although the reaction temperature is not limited, the reaction temperature is generally 0° C. to 150° C. and preferably room temperature to 100° C.

Furthermore, reaction accelerators such as amines, ammonium salts, and crown ethers may be added to the reaction system.

Instead of the oxyanion or the carboxylate anion, alcohols or carboxylic acids, which are the precursors, may react with bases in the reaction system to prepare the oxyanion or the carboxylate anion.

When the vinyl polymer includes ester groups in the side chains or the main chain, a less nucleophilic carboxylate anion is preferably used. A highly nucleophilic oxyanion may cause ester interchange.

Methods for Converting a Hydroxyl Group into an Alkenyl Group

A vinyl polymer having at least one alkenyl group can be produced from a vinyl polymer having at least one hydroxyl group. Examples of the method are described below, but are not limited to the following methods.

(A-g) A method including the steps of reacting a hydroxyl group in a vinyl polymer having at least one hydroxyl group with a base such as sodium methoxide, and reacting the product with an alkenyl halide such as allyl chloride.

(A-h) A method including the step of reacting a hydroxyl group in a vinyl polymer having at least one hydroxyl group with an alkenyl isocyanate such as allyl isocyanate.

(A-i) A method including the step of reacting a hydroxyl group in a vinyl polymer having at least one hydroxyl group with an acid halide containing an alkenyl group such as (meth)acryloyl chloride and 10-undecenoyl chloride in the presence of a base such as pyridine.

(A-j) A method including the step of reacting a hydroxyl group in a vinyl polymer having at least one hydroxyl group with a carboxylic acid containing an alkenyl group such as acrylic acid, pentenoic acid, and 10-undecenoic acid in the presence of an acid catalyst.

(A-k) A method including the steps of reacting a vinyl polymer having a hydroxyl group with a diisocyanate compound; and reacting the residual isocyanate group with a compound having both an alkenyl group and a hydroxyl group. Although the compound having both an alkenyl group and a hydroxyl group is not limited, examples of the compound include alkenyl alcohols such as 10-undecenol, 5-hexenol, and allyl alcohol.

Any known diisocyanate compound may be used. Examples of the diisocyanate compound include isocyanate compounds such as toluylene diisocyanate, 4,4'-diphenylmethane diisocyanate, hexamethyl diisocyanate, xylylene diisocyanate, meta-xylylene diisocyanate, 1,5-naphthalene diisocyanate, hydrogenated diphenylmethane diisocyanate, hydrogenated toluylene diisocyanate, hydrogenated xylylene diisocyanate, and isophorone diisocyanate. These compounds may be used alone or in combination. Blocked isocyanates may be also used.

Diisocyanate compounds not having an aromatic ring, for example, hexamethylene diisocyanate and hydrogenated diphenylmethane diisocyanate are preferably used in order to achieve superior weather resistance.

Methods for Synthesizing a Vinyl Polymer Having a Hydroxyl Group

Examples of the method for producing a vinyl polymer having at least one hydroxyl group are described below, but are not limited to the following methods.

(B-a) A method for synthesizing a vinyl polymer by atom transfer radical polymerization including the step of a reaction of, for example, a compound having both a polymerizable alkenyl group and a hydroxyl group per molecule as a second monomer, the compound represented by general formula (15):

$$H_2C=C(R^{14})-R^{15}-R^{16}-OH \qquad (15)$$

(wherein $R^{14}$, $R^{15}$, and $R^{16}$ are as defined above).

The compound having both a polymerizable alkenyl group and a hydroxyl group per molecule may be reacted at any time during the polymerization. If the polymer requires an elastic property, especially in living radical polymerization, the compound is preferably reacted as the second monomer at the end of the polymerization or after the reaction of the predetermined monomer.

(B-b) A method for synthesizing a vinyl polymer by atom transfer radical polymerization including the step of a reaction of an alkenyl alcohol such as 10-undecenol, 5-hexenol, and allyl alcohol at the end of the polymerization or after the reaction of the predetermined monomer.

(B-c) A method including the step of replacing a halogen atom with a terminal hydroxyl group by hydrolyzing or reacting a vinyl polymer produced by atom transfer radical polymerization and having at least one highly reactive carbon-halogen terminal bond with a compound containing a hydroxyl group.

(B-d) A method including the step of replacing a halogen atom with a hydroxyl group by reacting a vinyl polymer produced by atom transfer radical polymerization and having at least one highly reactive carbon-halogen terminal bond with a stabilized carbanion having a hydroxyl group represented by general formula (16):

(wherein $R^{18}$, $R^{19}$ and $R^{20}$ are as defined above).

Examples of the electron attractive groups $R^{18}$ and $R^{19}$ include —$CO_2R$ (ester group), —$C(O)R$ (keto group), —$CON(R_2)$ (amido group), —COSR (thioester group), —CN (nitrile group), and —$NO_2$ (nitro group). In particular, —$CO_2R$ (ester group), —$C(O)R$ (keto group) and —CN (nitrile group) are preferable. The substituent R represents an alkyl group of 1 to 20 carbon atoms, an aryl group of 6 to 20 carbon atoms, or an aralkyl group of 7 to 20 carbon atoms. The substituent R is preferably an alkyl group of 1 to 10 carbon atoms or a phenyl group.

(B-e) A method including the steps of preparing an enolate anion by reacting a vinyl polymer produced by atom transfer radical polymerization and having at least one highly reactive carbon-halogen terminal bond with a metal such as zinc or an organometallic compound; and reacting the resultant product with an aldehyde or a ketone.

(B-f) A method including the step of replacing a halogen atom with a hydroxyl group by reacting a vinyl polymer produced by atom transfer radical polymerization and having at least one highly reactive carbon-halogen terminal bond with an oxyanion having a hydroxyl group or a carboxylate anion having a hydroxyl group, for example, represented by general formula (17) or (18):

(wherein $R^{21}$ and $M^+$ are as defined above); or

(wherein $R^{22}$ and $M^+$ are as defined above).

All examples of $M^+$, the reaction conditions, and solvent described in Method (A-f) can be preferably used.

(B-g) A method for synthesizing a vinyl polymer by atom transfer radical polymerization including the step of a reaction of a compound having both an alkenyl group having low polymerizability and a hydroxyl group per molecule as a second monomer at the end of the polymerization or after the reaction of the predetermined monomer. Although the compound is not limited, examples of the compound include compounds represented by general formula (19):

(wherein $R^{14}$ and $R^{21}$ are as defined above).

The compounds represented by general formula (19) are not limited. In terms of availability, alkenyl alcohols such as 10-undecenol, 5-hexenol, and allyl alcohol are preferable.

In terms of ready control of the reaction, among Methods (B-a) to (B-g), Methods (B-b) and (B-f) are preferable.

Treatment with an adsorbent will now be described.

According to the method of the present invention, a vinyl monomer is polymerized by atom transfer radical polymerization, and then the resultant vinyl polymer is brought into contact with the adsorbent in the presence of an oxidizing agent.

The treatment with the adsorbent may be performed either on the vinyl polymer (crude product) that is the final product, or on an intermediate product to produce the vinyl polymer. In other words, the treatment with the adsorbent may be performed on any vinyl polymers, such as vinyl polymers having alkenyl groups, vinyl polymers having highly reactive carbon-halogen (in particular, bromine) bonds, vinyl polymers having hydroxyl groups, and other vinyl polymers.

The oxidizing agent used in the method of the present invention includes oxygen molecules and/or a substance that forms oxygen molecules by a reaction. Examples of the oxidizing agent are described below, but do not intend to limit the scope of the present invention.

(C-a) Heavy Metal Compounds

Examples of the heavy metal compound include manganese dioxide; permanganates such as sodium permanganate, potassium permanganate; manganese salts such as manganese acetate, manganese sulfate, and manganese pyrophosphate; chromium trioxide; dichromates such as sodium dichromate, potassium dichromate, and ammonium dichromate; chromyl chloride; tert-butyl chromate; chromyl acetate; lead tetraacetate; lead oxide; mercury acetate; mercury oxide; osmium tetroxide; ruthenium tetroxide; and selenium dioxide.

(C-b) Halogens

Examples of the halogen include halogens such as chlorine, bromine, iodine; interhalogen compounds such as chlorine fluoride, chlorine trifluoride, bromine trifluoride, bromine pentafluoride, bromine chloride, and iodine chloride.

(C-c) Nitroxide Compounds

Examples of the nitroxide compound include nitric acid; nitrates such as sodium nitrate, potassium nitrate, and ammonium nitrate; nitrites such as sodium nitrite and potassium nitrite; and nitrogen oxides such as dinitrogen oxide, dinitrogen trioxide, and nitrogen dioxide.

(C-d) Compounds Including Halogen and Oxygen Atoms

Examples of the compounds including halogen and oxygen atoms include chlorine dioxide; perhalogenic acids such as perchloric acid and periodic acid; chlorates such as sodium chlorate, potassium chlorate, and ammonium chlorate; perchlorates such as sodium perchlorate, potassium perchlorate, and ammonium perchlorate; chlorites such as sodium chlorite and potassium chlorite; hypochlorites such as sodium hypochlorite and calcium hypochlorite; bromates such as sodium bromate and potassium bromate; iodates such as sodium iodate and potassium iodate; and periodates such as sodium periodate and potassium periodate.

(C-e) Metal Peroxides

Examples of the metal peroxide include alkali metal peroxides such as sodium peroxide and potassium peroxide; and alkaline earth metal peroxides such as magnesium peroxide, calcium peroxide, and barium peroxide.

(C-f) Organic Peroxides

Examples of the organic peroxide include alkyl hydroperoxides such as tert-butyl hydroperoxide and cumyl hydroperoxide; diacyl peroxides such as dibenzoyl peroxide, di-p-nitrobenzoyl peroxide, and di-p-chlorobenzoyl peroxide; organic peracids such as peracetic acid, trifluoroperacetic acid, perbenzoic acid, meta-chloroperbenzoic acid, monoperphthalic acid, and performic acid; peracid esters such as tert-butyl peracetate and tert-butyl perbenzoate; and dialkyl peroxides such as ditert-butyl peroxide.

(C-g) Hydrogen Peroxide and its Derivatives

Examples of the hydrogen peroxide and its derivative include hydrogen peroxide; sodium percarbonate; perborates such as sodium perborate and potassium perborate; and urea peroxide. When these compounds are dissolved in water or are thermally degraded, these compounds generate hydrogen peroxide.

(C-h) Oxygen (Oxygen Molecule) and Ozone

Examples of the oxidizing agent further include persulfates such as sodium persulfate, potassium persulfate, and ammonium persulfate; potassium nitrosodisulfonate; and trichloroisocyanuric acid.

These oxidizing agents may be used alone or in combination. In terms of ease of handling and removing residue after the treatment of the polymer, the oxidizing agents preferably include the oxidizing agents described in Items (C-c) to (C-h), more preferably, hydrogen peroxide, its derivatives, oxygen, or ozone, and more preferably oxygen.

When oxygen is used as the oxidizing agent, the oxygen may be pure oxygen or an oxygen-containing gaseous mixture. Although the gas other than oxygen in the oxygen-containing gaseous mixture is not limited, the gas preferably includes inert gases such as nitrogen, helium, and argon. In particular, a mixed gas containing oxygen and nitrogen is preferable. When the oxygen-containing system includes an organic solvent, the oxygen concentration is preferably controlled to be less than the combustion threshold in order to avoid an explosion hazard.

The content of the oxidizing agent is not limited. When oxygen or ozone is used as the oxidizing agent, the content of the oxidizing agent is preferably as follows: The oxidizing agent contains oxygen atoms of, preferably, 0.1 to 5,000 molar ratio, more preferably 0.1 to 10 molar ratio, and most preferably, 0.1 to 5 molar ratio to the total transition metal in the reaction system. When a substance other than oxygen or ozone is used as the oxidizing agent, the content of the oxidizing agent is preferably as follows: The oxidizing agent contains oxygen atoms of, preferably, 0.1 to 100 molar ratio, more preferably 0.1 to 100 molar ratio, and most preferably, 0.1 to 10 molar ratio to the total transition metal in the reaction system.

Examples of the adsorbent used in the method of the present invention are described in the following Items (D-a) to (D-c). The adsorbent of the present invention is not limited to the following examples.

(D-a) Activated Carbon

Most part of activated carbon is composed of carbonaceous materials, and activated carbon has high adsorptivity. For example, the activated carbon is produced as follows: Wood, brown coal, or peat is treated with an activating agent such as zinc chloride and phosphoric acid and is subjected to dry distillation. Alternatively, charcoal is activated by water vapor. The activated carbon is generally powdered or granular. Both powdered and granular activated carbon may be used. Chemically activated carbon is acidic whereas activated carbon by water vapor treatment is basic due to the producing process.

(D-b) Synthetic Resin Adsorbents

Example of synthetic resin adsorbents includes ion exchange resins. General acidic ion exchange resins and basic ion exchange resins may be used as the ion exchange resins. Chelate ion exchange resins may also be used. Examples of the functional groups of the acidic ion exchange resins include a carboxylic acid group and sulfonic acid group; examples of the functional groups of the basic ion exchange resins include an amino group, and examples of the functional groups of the chelate ion exchange resins include an iminodiacetic acid group and polyamine group.

(D-c) Inorganic Adsorbents

Inorganic adsorbents are each solid acid, solid base, or neutral. The inorganic adsorbents have high adsorption capacity due to the porous structure of the particles. Furthermore, the inorganic adsorbents are characterized in that they can be used at a wide range of temperature. The inorganic adsorbent is not limited. Typical examples of the inorganic adsorbent are mainly composed of at least one of, for example, aluminum, magnesium, and silicon. Examples of the inorganic adsorbent include silicon dioxide; magnesium oxide; silica gel; silica-alumina, aluminum silicate; magnesium silicate; activated alumina; clay adsorbents such as acid clay and activated clay; zeolite adsorbents that are generically named as hydrous aluminosilicate minerals such as aluminum sodium silicate; dawsonites; and hydrotalcites.

Examples silicon dioxide may be crystalline, amorphous, noncrystalline, glassy, synthetic, or natural. Any powdery silicon dioxide may be used. Examples of silicon dioxide include silicic acid produced from clay minerals prepared by acid treatment of activated clay; and synthetic silicic acid such as Carplex BS304, Carplex BS304F, Carplex #67, and Carplex #80 (Shionogi & Co., Ltd.). Silicon dioxide is not limited to the above examples.

In aluminum silicate, silicon in silicic acid is partially replaced with aluminum. Examples of aluminum silicate include pumice, fly ash, kaolin, bentonite, activated clay, and diatomaceous earth. In particular, synthetic aluminum silicate has a large specific surface area and high adsorption capacity. Although examples of the synthetic aluminum silicate include Kyowaad 700 series (Kyowa Chemical Industry Co., Ltd.), the synthetic aluminum silicate is not limited to the above.

Both natural zeolite and synthetic zeolite may be used.

In hydrotalcite compounds, hydroxyl groups of aqueous hydroxides of a divalent metal (for example, $Mg^{2+}$, $Mn^{2+}$, $Fe^{2+}$, $Co^{2+}$, $Ni^{2+}$, $Cu^{2+}$, or $Zn^{2+}$) and a trivalent metal (for example, $Al^{3+}$, $Fe^{3+}$, $Cr^{3+}$, $Co^{3+}$, or $In^{3+}$) or hydroxyl groups of the hydroxides are partially replaced with an anion such as halide ions, $NO_3^-$, $CO_3^{2-}$, $SO_4^{2-}$, $Fe(CN)_6^{3-}$, $CH_3CO_2^-$, oxalate ion, or salicylate ion. A hydrotalcite is preferable in which the divalent metal is $Mg^{2+}$, the trivalent metal is $Al^{3+}$, and the hydroxyl groups is replaced with $CO_3^{2-}$. Although examples of the synthesized hydrotalcite include Kyowaad 500 series and Kyowaad 1000 series (Kyowa Chemical Industry Co., Ltd.), the hydrotalcite is not limited to the above. Furthermore, adsorbents produced by firing the above hydrotalcites are also preferably used. In particular, an $MgO-AlO_3$ solid solution produced by firing a hydrotalcite is preferable in which the divalent metal is $Mg^{2+}$ and the trivalent metal is $Al^{3+}$. Although examples of the fired hydrotalcite include Kyowaad 2000 (Kyowa Chemical Industry Co., Ltd.), the hydrotalcite is not limited to the above. According to the present invention, the fired products of the hydrotalcites are also referred to as hydrotalcites.

The adsorbents are preferably inorganic adsorbents or activated carbon, more preferably, magnesium oxide, activated clay, aluminum silicate, activated alumina, or hydrotalcites, and most preferably, aluminum silicate or hydrotalcites. In particular, both aluminum silicate and hydrotalcites are preferably used together.

The adsorbents may be used alone or in combination.

The content of the adsorbent may be generally 0.1 to 500 parts by weight to 100 parts by weight of the vinyl polymer. In view of economical efficiency and handling, the content of the adsorbent is preferably 0.5 to 10 parts by weight, more preferably, 0.5 to 5 parts by weight to 100 parts by weight of the vinyl polymer.

According to the purification process in the method of the present invention, the vinyl polymer may be brought into contact with the adsorbent in the presence of the oxidizing agent. Alternatively, the oxidizing agent may be brought into contact with the vinyl polymer, and then the adsorbent may be brought into contact with the vinyl polymer.

A method including the step of bringing the vinyl polymer into contact with the adsorbent in the presence of the oxidizing agent will now be described.

When oxygen or ozone is used as the oxidizing agent, the adsorbent may be brought into contact with the vinyl polymer in a system containing oxygen or ozone. This process may be performed in the presence of a solvent or in a solvent-free system.

Various methods are available for the gas-liquid contact between oxygen or ozone and the vinyl polymer or the solution of the vinyl polymer, and the methods are not limited. Specifically, examples of methods include batch processes by stirring and by gas bubbling through an orifice, and a bubble column process of bubbling gas through the polymer solution in a container. In addition to the mixing and dispersion by stirring, if necessary, other operations, for example, shaking of the container and ultrasonic waves may be employed in order to improve the dispersion efficiency. When the mixing is performed by stirring, the vapor-phase in the container is preliminarily filled with gas. In some cases, a single filling operation cannot supply a required amount of gas. In this case, appropriate replacement or supplement of the gas in the vapor-phase can be performed to continue the oxidation treatment.

When the oxidizing agent other than oxygen and ozone is used, the mixture of the oxidizing agent and the vinyl polymer is brought into contact with the adsorbent. This process may be performed in the presence of a solvent or in a solvent-free system.

The solvents used in the purification process in the method of the present invention are not limited. Examples of the solvent include aliphatic hydrocarbons such as n-hexane, n-heptane, n-octane, cyclohexane, methylcyclohexane, and ethylcyclohexane; aromatic hydrocarbons such as toluene and xylenes; fatty acid esters such as butyl acetate; and ethers such as diethyl ether. Preferably, n-hexane, cyclohexane, methylcyclohexane, ethylcyclohexane, toluene, xylenes, butyl acetate, and diethyl ether are used.

In particular, the relative dielectric constant at 25° C. of the solvent is preferably 5 or less. The reason is as follows: Although the vinyl polymer is dissolved in a solvent having low polarity, the remaining transition metal complex can become insolubilized and coalesced. A solvent having a low relative dielectric constant is a poor solvent of the transition metal complex. Accordingly, the addition of a solvent having a low relative dielectric constant facilitates insolubilization of the transition metal complex, and the insolubilized transition metal complexes collide with each other to coalesce. The insolubilized and coalesced transition metal complex and transition metal are readily removed by the adsorbent.

According to the present invention, insolubilization is defined as follows: The solid content of the transition metal complex that cannot be dissolved and is precipitated is 0.1 weight percent or more relative to the total weight of the transition metal complex in the solution.

According to the present invention, coalescence is defined as follows: In a dynamic light scattering measurement, the relaxation time of the intensity correlation function increases in the range of 1 millisecond to 1,000 milliseconds. In the dynamic light scattering measurement, a time-series light scattering measurement is continuously performed within the measuring time range from 1 minute to 72 hours. The relaxation times of the intensity correlation function at individual elapsed times are compared.

(Dynamic Light Scattering Measurement)

A dynamic light scattering instrument DLS 7000 (Otsuka Electronics Co., Ltd.) and analysis software ALV 5000 (ALV of Germany) are used. An example of the laser used in the measurement includes a visible light laser such as a helium-neon laser and argon laser. A sufficient laser output is 75 mW or more. A laser output less than 35 mW impairs the accuracy of the measurement. With regard to the measurement conditions, the scattering angle is from 30° to 150°, preferably, from 60° to 120°, and the measuring temperature is from 5° C. to 100° C., preferably, from 20° C. to 40° C. In the present invention, in order to confirm the coalescence of the transition metal complex, the relaxation times were measured under the following conditions: The laser output was 70 mW, the scattering angle was 90°, and the measuring temperature was 25° C.

The solvents that have a relative dielectric constant of 5 or less at 25° C. are not limited. Examples of the solvent include aliphatic hydrocarbons such as n-hexane, n-heptane, n-octane, cyclohexane, methylcyclohexane, and ethylcyclohexane; and aromatic hydrocarbons such as toluene and xylenes. These solvents may be used alone or in combination as long as the polymer can be dissolved.

The content of the solvent is generally 10 to 1,000 parts by weight, preferably, 50 to 500 parts by weight relative to 100 parts by weight of the vinyl polymer. A content of the solvent less than 10 parts by weight decreases the effect of insolubilization and coalescence. On the other hand, a content of the solvent exceeding 1,000 parts by weight no longer improve the insolubilization effects. Furthermore, in view of the recovering cost of the solvents, this is actually a wasteful manufacturing process.

The apparatus used for dissolving the polymer in the solvent is not limited. For example, a general-purpose stirring tank may be used in a batch process, whereas a line mixer may be used in a continuous process.

Various methods are available for the solid-liquid contact between the adsorbent and the vinyl polymer or the solution of the vinyl polymer, and the methods are not limited. Specifically, examples of the method include a batch process including stirring and solid-liquid separation performed by an batch operation, a fixed-bed process allowing the polymer solution to flow through the adsorbent filled in a container, a moving-bed process allowing the polymer solution to flow through a moving-bed having the adsorbent, and a fluidized-bed process for performing the adsorption by fluidizing the adsorbent with the polymer solution. In addition to the mixing and dispersion by stirring, if necessary, other operations, for example, shaking of the container and ultrasonic waves may be employed in order to improve the dispersion efficiency.

In the treatment with the adsorbent, adding water to the vinyl polymer or the solution of the vinyl polymer can decrease the content of the transition metal complex in the solution of the vinyl polymer. The insolubilized transition metal complex has a strong affinity with water. Therefore, adding water can concentrate the transition metal complex in the aqueous phase. Since the specific gravity of the water containing the transition metal complex is considerably larger than that of the polymer solution, the transition metal complex is readily separated by centrifugation or filtration. Furthermore, the transition metal complex can be separated by simpler methods such as plain sedimentation.

The additive content of water is generally 0.1 to 1,000 molar ratio, preferably 0.1 to 500 molar ratio to the total of the transition metal in the reaction system. Before the solid-liquid separation, water may be added at any time by any method.

The temperature during the contact is not limited, and is generally 0° C. to 250° C., preferably, 20° C. to 250° C., and more preferably, 80° C. to 250° C. High temperature is preferable because the coalescence of the transition metal complex is accelerated and the purification of the vinyl polymer is facilitated. However, an excessively high temperature may impair the quality of the vinyl polymer.

Also, the duration of the treatment is not limited, as long as the object of the present invention can be achieved. The treatment can generally be performed for about 30 minutes to about 300 minutes.

The polymer or the polymer solution is brought into contact with the adsorbent, and then the adsorbent is removed by, for example, filtration, centrifugation, or plain sedimentation. If necessary, dilution and water washing may be employed. Thus, a desired polymer or polymer solution can be recovered.

A method including the steps of bringing the oxidizing agent into contact with the vinyl polymer, and then bringing the adsorbent into contact with the vinyl polymer will now be described.

When oxygen or ozone is used as the oxidizing agent, the vinyl polymer may be brought into contact with oxygen or ozone in a system containing oxygen or ozone, and then the adsorbent may be brought into contact with the vinyl polymer. Both of the processes may be performed in the presence of a solvent or in a solvent-free system. As described above, both of the processes may be performed in the presence of water.

When an oxidizing agent other than oxygen and ozone is used, the oxidizing agent and the vinyl polymer may be mixed, the oxidizing agent may be brought into contact with the vinyl polymer (preferably by stirring), and then the adsorbent may be brought into contact with the vinyl polymer. Both of the processes may be performed in the presence of a solvent or in a solvent-free system. Examples of the solvent include the same described above. Furthermore, as described above, both of the processes may be performed in the presence of water.

Various methods are available for the gas-liquid contact between oxygen or ozone and the vinyl polymer or the solution of the vinyl polymer, and the methods are not limited. Specifically, examples of methods include batch processes by stirring and by gas bubbling through an orifice, and a bubble column process of bubbling gas through the polymer solution in a container. In addition to the mixing and dispersion by stirring, if necessary, other operations, for example, shaking of the container and ultrasonic waves may be employed in order to improve the dispersion efficiency. When the mixing is performed by stirring, the vapor-phase in the container is preliminarily filled with gas. In some cases, a single filling operation cannot supply a required amount of gas. In this case, appropriate replacement or supplement of the gas in the vapor-phase can be performed to continue the oxidation treatment.

When the oxidizing agent is brought into contact with the vinyl polymer, the temperature is generally 0° C. to 250° C., preferably, 20° C. to 250° C., and more preferably, 80° C. to 250° C.

Also, the duration of the treatment is not limited, as long as the object of the present invention can be achieved. The treatment can be generally performed for about 30 minutes to about 300 minutes.

Various methods are available for the solid-liquid contact between the adsorbent and the vinyl polymer or the solution of the vinyl polymer, and the methods are not limited. Specifically, examples of the method include a batch process including stirring and solid-liquid separation performed by an batch operation, a fixed-bed process allowing the polymer solution to flow through the adsorbent filled in a container, a moving-bed process allowing the polymer solution to flow through a moving-bed having the adsorbent, and a fluidized-bed process for performing the adsorption by fluidizing the adsorbent with the polymer solution. In addition to the mixing and dispersion by stirring, if necessary, other operations, for example, shaking of the container and the use of ultrasonic waves may be used in order to improve the dispersion efficiency.

When the adsorbent is brought into contact with the vinyl polymer, the temperature is not limited. The temperature is generally 0° C. to 250° C., preferably, 20° C. to 250° C., and more preferably, 80° C. to 250° C. High temperature is preferable because the coalescence of the transition metal complex is accelerated and the purification of the vinyl polymer is facilitated. However, an excessively high temperature may impair the quality of the vinyl polymer.

Also, the duration of the contact is not limited, as long as the object of the present invention can be achieved. The contact process can be generally performed for about 30 minutes to about 300 minutes.

The polymer or the polymer solution is brought into contact with the adsorbent, and then the adsorbent is removed by, for example, filtration, centrifugation, or plain sedimentation. If necessary, dilution and water washing may be employed. Thus, a desired polymer or polymer solution can be recovered.

According to a first preferable embodiment of the present invention, a vinyl monomer is polymerized by atom transfer radical polymerization in the presence of a polymerization solvent with a transition metal complex as a polymerization catalyst, subsequently the polymerization solvent is removed, and the resultant vinyl polymer can be brought into contact with the adsorbent in the presence of the oxidizing agent.

According to a second preferable embodiment of the present invention, a vinyl monomer is polymerized by atom transfer radical polymerization with a transition metal complex as a polymerization catalyst, subsequently, if necessary, a polymerization solvent is removed, and the resultant vinyl polymer is brought into contact with the adsorbent in the presence of the oxidizing agent and a solvent (a first contact process). Furthermore, the vinyl polymer can be brought into contact with the adsorbent in the presence of the oxidizing agent in a solvent-free system (a second contact process). In this case, the transition metal is roughly removed in the first contact process, and the purity of the vinyl polymer can be further improved in the second contact process. A reaction to convert the functional groups of the vinyl polymer may be performed between the first contact process and the second contact process.

Reactive Composition Susceptible to Hydrosilylation

The reactive composition susceptible to hydrosilylation of the present invention includes the vinyl polymer produced by the method of the present invention.

Examples of the reactive composition susceptible to hydrosilylation of the present invention include reactive compositions susceptible to hydrosilylation containing vinyl polymers (A) having alkenyl groups in the molecule and compounds (B) having hydrosilyl groups.

The vinyl polymers (A) may be the above-mentioned vinyl polymers having alkenyl groups in the molecule produced by atom transfer radical polymerization. The compounds (B) having hydrosilyl groups are not limited and various compounds can be used. Examples of the compounds (B) having hydrosilyl groups include a compound having at least 1.1 hydrosilyl groups per molecule and hydrosilane compounds having crosslinkable silyl groups. Examples of the reactive compositions susceptible to hydrosilylation are described below.

<Reactive Composition Susceptible to Hydrosilylation (1)>

Compounds (B) having at least 1.1 hydrosilyl groups per molecule form cured materials by hydrosilylation. That is, the reactive compositions susceptible to hydrosilylation are curable compositions (curable composition (1)).

The compounds having at least 1.1 hydrosilyl groups per molecule are not limited. Examples of the compound include polysiloxanes represented by general formula (22) or (23):

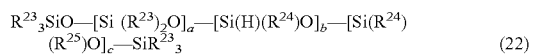

(22)

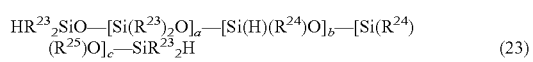

(23)

(wherein each of $R^{23}$ and $R^{24}$ represents an alkyl group of 1 to 6 carbon atoms, or a phenyl group; $R^{25}$ represents an alkyl group of 1 to 10 carbon atoms or an aralkyl group of 1 to 10 carbon atoms; and a, b, and c independently represent an integer that satisfies the following formulae: $100 \geq a \geq 0$, $100 \geq b \geq 2$, and $100 \geq c \geq 0$), and cyclosiloxanes represented by general formula (24):

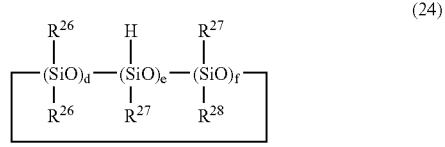

(24)

(wherein each of $R^{26}$ and $R^{27}$ represents an alkyl group of 1 to 6 carbon atoms, or a phenyl group; $R^{28}$ represents an alkyl group of 1 to 10 carbon atoms or an aralkyl group of 1 to 10 carbon atoms; and d, e, and f independently represent an integer that satisfies the following formulae: $8 \geq d \geq 0$, $10 \geq e \geq 2$, $8 \geq f \geq 0$, and $10 \geq d+e+f \geq 3$).

These compounds may be used alone or in combination. In particular, in terms of the compatibility with (meth) acrylic polymers, linear siloxanes having phenyl groups represented by general formula (25) or (26), and cyclosiloxanes having phenyl groups represented by general formula (27) or (28) are preferable:

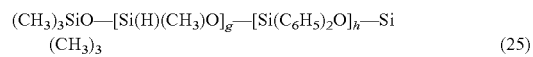

(25)

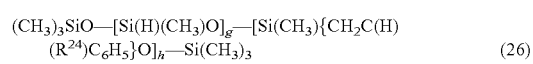

(26)

(wherein $R^{24}$ represents a hydrogen atom or a methyl group, g and h independently represent an integer that satisfies the following formulae: $100 \geq g \geq 2$ and $100 \geq h \geq 0$, and $C_6H_5$ represents a phenyl group):

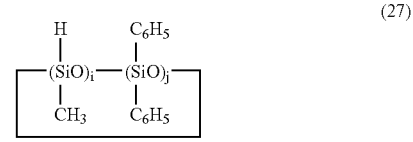

(27)

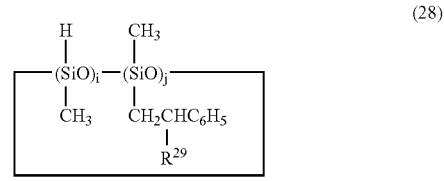

(28)

(wherein $R^{29}$ represents a hydrogen atom or a methyl group, i and j independently represent an integer that satisfies the following formulae: $10 \geq i \geq 2$, $8 \geq j \geq 0$, and $10 \geq a \geq +j \geq 3$, and $C_6H_5$ represents a phenyl group).

The compounds (B) having at least 1.1 hydrosilyl groups per molecule further include compounds produced by addition reaction of compounds having hydrosilyl groups represented by general formulae (22) to (28) and low molecular compounds having at least two alkenyl groups per molecule, the addition reaction being performed so that the hydrosilyl groups partly remain after the reaction. Various compounds having at least two alkenyl groups per molecule may be used. Examples of the compounds having at least two alkenyl groups include hydrocarbons such as 1,4-pentadiene, 1,5-hexadiene, 1,6-heptadiene, 1,7-octadiene, 1,8-nonadiene, and 1,9-decadiene; ethers such as O,O'-diallyl bisphenol A and 3,3-diallyl bisphenol A; esters such as diallyl phthalate, diallyl isophthalate, triallyl trimellitate, and tetraallyl pyromellitate; and carbonates such as diethylene glycol diallyl carbonate.

The above compounds having alkenyl groups are added dropwise slowly to an excess of the compounds having hydrosilyl groups represented by general formulae (22) to (28) in the presence of a hydrosilylation catalyst to produce the compound having hydrosilyl groups. In terms of the availability of raw materials, the ease to remove the excess of siloxane used, and the compatibility with the vinyl polymer, the following compounds are preferable:

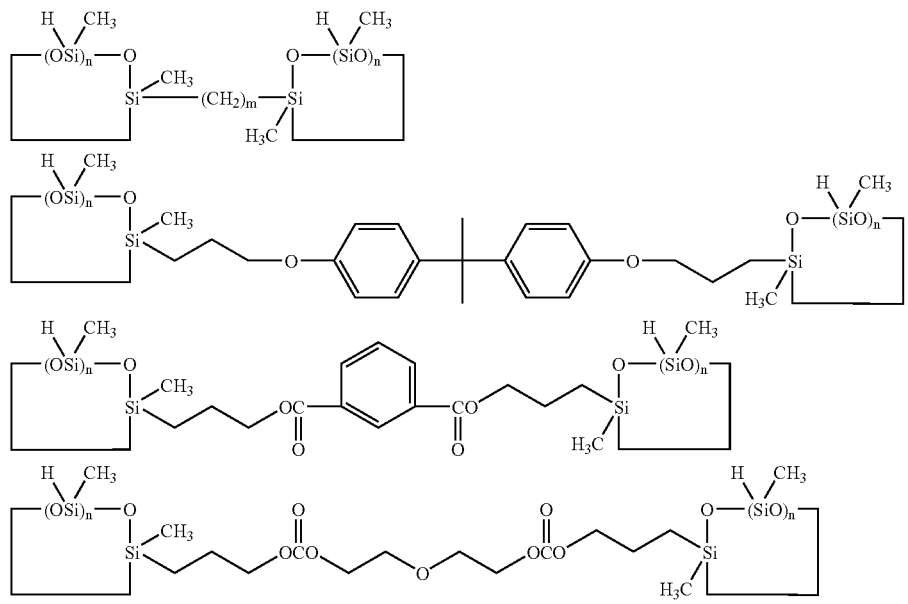

(wherein n represents an integer of 2 to 4 and m represents an integer of 5 to 10).

The vinyl polymers (A) and the compounds (B) having hydrosilyl groups may be mixed at any ratio. However, in terms of the curing ability, the molar ratio of the alkenyl group to the hydrosilyl group is preferably 5 to 0.2 and more preferably 2.5 to 0.4. When the molar ratio exceeds 5, the cured material is sticky and has poor strength because of insufficient curing. On the other hand, when the molar ratio is less than 0.2, a large amount of the active hydrosilyl group remains in the cured material even after curing. Accordingly, the cured material has cracks and voids and is not uniform, and the cured material has poor strength.

The curing reaction of the vinyl polymers (A) and the compounds having hydrosilyl groups (B) proceeds by mixing and heating the two components. In order to promote the reaction, a hydrosilylation catalyst may be added. The hydrosilylation catalyst is not limited. Examples of the hydrosilylation catalyst include radical initiators such as organic peroxides and azo compounds; and transition metal catalysts.

The radical initiator is not limited. Examples of the radical initiator include dialkyl peroxides such as di-tert-butyl peroxide, 2,5-dimethyl-2,5-di(tert-butylperoxy)hexane, 2,5-dimethyl-2,5-di(tert-butylperoxy)-3-hexyne, dicumyl peroxide, tert-butylcumyl peroxide, and α,α'-bis(tert-butylperoxy)isopropylbenzene; diacyl peroxides such as benzoyl peroxide, p-chlorobenzoyl peroxide, m-chlorobenzoyl peroxide, 2,4-dichlorobenzoyl peroxide, and lauroyl peroxide; peracid esters such as tert-butyl perbenzoate; peroxydicarbonates such as diisopropyl peroxydicarbonate; and di-2-ethylhexyl peroxydicarbonate; and peroxyketals such as 1,1-di-(tert-butylperoxy)cyclohexane and 1,1-di-(tert-butylperoxy)-3,3,5-trimethylcyclohexane.

The transition metal catalysts are also not limited. Examples of the transition metal catalysts include catalysts wherein solid platinum is dispersed on a carrier of elemental platinum, alumina, silica, or carbon black; chloroplatinic acid; complexes of chloroplatinic acid with alcohols, aldehydes, or ketones; platinum-olefin complexes; and platinum (0)-divinyl tetramethyl disiloxane complex. Examples of the catalyst other than platinum compounds include $RhCl(PPh_3)_3$, $RhCl_3$, $RuCl_3$, $IrCl_3$, $FeCl_3$, $AlCl_3$, $PdCl_2 \cdot H_2O$, $NiCl_2$, and $TiCl_4$. These catalysts may be used alone or in combination. Although the content of the catalyst is not limited, the content of the catalyst is preferably $10^{-1}$ to $10^{-8}$ moles, preferably, $10^{-3}$ to $10^{-6}$ moles to one mole of the alkenyl group in the vinyl polymers (A). When the content of the catalyst is less than $10^{-8}$ moles, the curing does not proceed sufficiently. The hydrosilylation catalysts are generally expensive and corrosive; furthermore, a large amount of hydrogen gas is generated to cause undesirable foaming of the cured material. Accordingly, the content of the catalyst is preferably less than $10^{-1}$ moles.

Although the curing temperature is not limited, the curing temperature is generally 0° C. to 200° C., preferably, 30° C. to 150° C., and more preferably, 80° C. to 150° C. The cured material can be formed in a short time in this temperature range.

<Reactive Composition Susceptible to Hydrosilylation (2)>

The compounds (B) having hydrosilyl groups may be hydrosilane compounds having crosslinkable silyl groups.

The hydrosilane compounds having crosslinkable silyl groups are not limited. Typical hydrosilane compounds having crosslinkable silyl groups are represented by general formula (29):

$$H-[Si(R^{11})_{2-b}(Y)_bO]_m-Si(R^{12})_{3-a}(Y)_a \qquad (29)$$

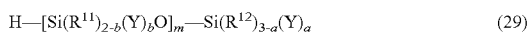

{wherein, each of $R^{11}$ and $R^{12}$ represents an alkyl group of 1 to 20 carbon atoms, an aryl group of 6 to 20 carbon atoms, an aralkyl group of 7 to 20 carbon atoms, or a triorganosiloxy group represented by $(R')_3SiO-$ (wherein R' represents a monovalent hydrocarbon group of 1 to 20 carbon atoms and the three R's may be the same or different); when the number of $R^{11}$s or $R^{12}$s is two or more, $R^{11}$s and $R^{12}$s may be the same or different; Y represents a hydroxyl group or a hydrolyzable group; when the number of Ys is two or more, Ys may be the same or different; a represents 0, 1, 2, or 3, b represents 0, 1, or 2, and m represents an integer of 0 to 19, wherein $a+mb \geq 1$)}.

Examples of the hydrolyzable group include hydrolyzable groups generally used such as, a hydrogen atom, alkoxy groups, acyloxy groups, ketoximate groups, an amino group, an amido group, an aminooxy group, a mercapto group, and alkenyloxy groups. Among these groups, alkoxy groups, an amido group, and an aminooxy group are preferable. In terms of easy handling due to mild hydrolyzability, alkoxy groups are particularly preferable.

The number of the hydrolyzable groups or the hydroxyl groups that can be bonded with one silicon atom is 1 to 3, and the number represented by a formula (a+Σb) is preferably 1 to 5. When the number of the hydrolyzable groups or the hydroxyl groups that are bonded with the crosslinkable silyl groups is two or more, the hydrolyzable groups or the hydroxyl groups may be the same or different. The number of silicon atoms that form the crosslinkable silyl groups is one or more. However, when the silicon atoms are connected through, for example, siloxane bonds, the number of the silicon atoms is preferably 20 or less.

Among these hydrosilane compounds, compounds having a crosslinkable group represented by general formula (30):

$$H-Si(R^{12})_{3-a}(Y)_a \qquad (30)$$

(wherein $R^{12}$, Y, and a are as defined above)

are particularly preferable, in terms of the availability.

Reactive compositions susceptible to hydrosilylation containing the above hydrosilane compounds (B) are subjected to hydrosilylation to produce vinyl polymers having crosslinkable silyl groups.

Vinyl polymers having at least 1.1 crosslinkable silyl groups per molecule are crosslinked and form cured materials. The present invention also provides the vinyl polymers having at least 1.1 crosslinkable silyl groups per molecule produced by the above method, and the curable compositions containing the vinyl polymers (curable composition (2)).

Examples of the crosslinkable silyl groups according to the present invention are represented by general formula (31):

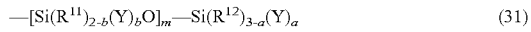

$$-[Si(R^{11})_{2-b}(Y)_bO]_m-Si(R^{12})_{3-a}(Y)_a \qquad (31)$$

{wherein, each of $R^{11}$ and $R^{12}$ represents an alkyl group of 1 to 20 carbon atoms, an aryl group of 6 to 20 carbon atoms, or an aralkyl group of 7 to 20 carbon atoms or a triorganosiloxy group represented by (R')$_3$SiO— (wherein R' represents a monovalent hydrocarbon group of 1 to 20 carbon atoms and the three R's may be the same or different); when the number of R's or $R^{12}$s is two or more, $R^{11}$s and $R^{12}$s may be the same or different; Y represents a hydroxyl group or a hydrolyzable group; when the number of Ys is two or more, Ys may be the same or different; a represents 0, 1, 2, or 3, b represents 0, 1, or 2, and m represents an integer of 0 to 19, wherein a+mb≧1)}.

Examples of the hydrolyzable group include hydrolyzable groups generally used such as, a hydrogen atom, alkoxy groups, acyloxy groups, ketoximate groups, an amino group, an amido group, an aminooxy group, a mercapto group, and alkenyloxy groups. Among these groups, alkoxy groups, an amido group, and an aminooxy group are preferable. In terms of easy handling due to mild hydrolyzability, alkoxy groups are particularly preferable.

The number of the hydrolyzable groups or the hydroxyl groups that can be bonded with one silicon atom is 1 to 3, and the number represented by a formula (a+Σb) is preferably 1 to 5. When the number of the hydrolyzable groups or the hydroxyl groups that are bonded with the crosslinkable silyl groups is two or more, the hydrolyzable groups or the hydroxyl groups may be the same or different. The number of silicon atoms that form the crosslinkable silyl groups is one or more. However, when the silicon atoms are connected through, for example, siloxane bonds, the number of the silicon atoms is preferably 20 or less. In particular, crosslinkable silyl groups represented by general formula (32):

$$-Si(R^{12})_{3-a}(Y)_a \qquad (32)$$

(wherein $R^{10}$, Y, and a are as defined above)

are preferable, in terms of the availability.

If the cured material produced by curing the vinyl polymer having crosslinkable silyl groups according to the present invention especially requires an elastic property, at least one of the crosslinkable silyl groups is preferably located at one end of the molecular chain because this molecular chain structure can increase the molecular weight between crosslinks that greatly effects on the rubber elasticity. More preferably, the vinyl polymer includes all the functional groups at the ends of the molecular chain.

Although the ratio of the vinyl polymers (A) to the hydrosilane compounds (B) having crosslinkable silyl groups is not limited, the content of the hydrosilyl groups is preferably equivalent or more of the content of the alkenyl groups.

In order to promote hydrosilylation, a hydrosilylation catalyst may be added. Any hydrosilylation catalyst described above may be used.

Although the reaction temperature is not limited, the reaction temperature is generally 0° C. to 200° C., preferably, 30° C. to 150° C., and more preferably, 80° C. to 150° C.

When the curable composition (2) is cured, a condensation catalyst may be used or not. Examples of the condensation catalyst include titanates such as tetrabutyl titanate and tetrapropyl titanate; organotin compounds such as dibutyltin dilaurate, dibutyltin diacetylacetonate, dibutyltin maleate, dibutyltin diacetate, dibutyltin dimethoxide, tin octylate, and tin naphthenate; lead octylate; amines or the carboxylates thereof such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine, and 1,3-diazabicyclo(5,4,6)undecene-7; reaction products and mixtures of amines and organotin compounds such as reaction product and mixture of laurylamine and tin octylate; low molecular weight polyamide resins produced from an excess polyamine and a polybasic acid; reaction products of an excess polyamine and an epoxy compound; and silane coupling agents having amino groups, for example, γ-aminopropyltrimethoxysilane, N-(β-aminoethyl) aminopropylmethyldimethoxysilane. If necessary, at least one of these known silanol catalysts may be used. The content of the catalyst is preferably 0 to 10 weight percent of the vinyl polymer having crosslinkable terminal silyl groups. When the hydrolyzable group Y is an alkoxy group, the curing rate of the polymers is low. Accordingly, the curing catalyst is preferably added.

<Curable Composition>

In order to control the physical properties, if necessary, various additives may be appropriately mixed with the above curable composition (1) and curable composition (2). Examples of the additives include flame retardants, age resisters, fillers, plasticizers, physical-property modifiers, reactive diluents, adhesive agents (i.e., adhesion-imparting agents), storage stability improvers, solvents, radical inhibitors, metal deactivators, antiozonants, phosphorus peroxide decomposers, lubricants, pigments, foaming agents, and photocurable resins. These additives may be used alone or in combination.

Since vinyl polymers originally have superior durability, the age resisters are not always necessary. However, known additives such as antioxidants, ultraviolet absorbers, and light stabilizers may be appropriately added.

<Fillers>

Any filler may be mixed. In order to improve a physical property such as strength, examples of reinforcing filler include silica particles, calcium carbonate, talc, titanium oxide, diatomaceous earth, barium sulfate, carbon black, surface treated fine calcium carbonate, fired clay, clay, and active zinc flower. These reinforcing fillers may be used alone or in combination. Among these reinforcing fillers, silica particles are preferable. Examples of the silica particles include hydrated silica produced by a wet process and dry-process silica produced by a dry process. In particular, silica anhydride is preferably added because large water content in the compositions may cause, for example, side reaction during the curing reaction. Silica anhydride whose surface is subjected to hydrophobic treatment is more preferably added because the composition has appropriate fluidity during molding. Furthermore, fillers having low reinforcing property may be used in order to increase the weight or to adjust the physical property.

<Plasticizer>

Any plasticizer may be mixed. In order to modify the physical property and to control the appearance, examples of the plasticizer include phthalate esters such as dibutylphthalate, diheptylphthalate, di(2-ethylhexyl)phthalate, and butylbenzylphthalate; nonaromatic dibasic acid esters such as dioctyl adipate, dioctyl sebacate, dibutyl sebacate, and isodecyl succinate; aliphatic esters such as butyl oleate and methyl acetyl ricinoleate; polyalkyleneglycol esters such as diethyleneglycol dibenzoate, triethyleneglycol dibenzoate, and pentaerythritol esters; phosphoric esters such as tricresyl phosphate and tributyl phosphate; trimellitates; polystyrenes such as polystyrene and poly-α-methylstyrene; polybutadiene, polybutene, polyisobutylene, butadiene-acrylonitrile, polychloroprene; chlorinated paraffins; hydrocarbon oils such as alkyldiphenyl and hydrogenated terphenyl; process oils; polyethers such as polyetherpolyols, e.g. polyethylene glycol, polypropylene glycol and polytetramethylene glycol, and derivatives produced by replacing the hydroxyl groups of the polyetherpolyols with, for example, ester groups and ether groups; epoxy plasticizer such as epoxydized soybean oil and benzyl epoxystearate; polyester plasticizers derived from dibasic acids (e.g. sebacic acid, adipic acid, azelaic acid, and phthalic acid) and dihydric alcohols (e.g. ethylene glycol, diethylene glycol, triethylene glycol, propylene glycol, and dipropylene glycol); and vinyl polymers produced by polymerizing vinyl monomers such as acrylic plasticizer using various methods. Although these plasticizers may be used alone or in combination, the plasticizers are not always necessary. These plasticizers may be mixed during producing the polymers.

<Storage Stability Improvers>

Any storage stability improvers may be mixed. The storage stability improvers suppress the increase in viscosity during storage of the composition, and suppress a significant change in the curing rate after storage of the composition. Examples of the storage stability improver include benzothiazole and dimethyl maleate.

<Solvents>

Examples of the solvents include aromatic hydrocarbons such as toluene and xylenes; esters such as ethyl acetate, butyl acetate, amyl acetate, and cellosolve acetate; and ketones such as methyl ethyl ketone, methyl isobutyl ketone, and diisobutyl ketone. These solvents may be used during producing the polymers.

<Adhesive Agents>

Any adhesive agents (i.e., adhesion-imparting agents) that provide the cured materials with adhesiveness may be used. Compounds having crosslinkable silyl groups are preferable, and silane coupling agents are more preferable. Examples of the silane coupling agent include alkylalkoxysilanes such as methyltrimethoxysilane, dimethyldimethoxysilane, trimethylmethoxysilane, and n-propyltrimethoxysilane; alkylisopropenoxy silanes such as dimethyldiisopropenoxy silane and methyltriisopropenoxy silane; silanes having vinyl unsaturated groups such as vinyltrimethoxysilane, vinyldimethylmethoxysilane, vinyltriethoxysilane, γ-methacryloyloxypropyl methyldimethoxysilane, and γ-acryloyloxypropyl methyltriethoxysilane; silicone varnishes; and polysiloxanes.

In particular, preferable silane coupling agents include organic groups that include atoms other than a carbon atom and a hydrogen atom (e.g. epoxy, (meth)acrylic, isocyanate, isosyanurate, carbamate, amino, mercapto, and carboxyl groups) and crosslinkable silyl groups. Examples of alkoxy silanes having an isocyanate group include silanes having an isocyanate group such as γ-isocyanatopropyltrimethoxysilane, γ-isocyanatopropyltriethoxysilane, γ-isocyanatopropylmethyldiethoxysilane, and γ-isocyanatopropylmethyldimethoxysilane. Examples of alkoxy silanes having isocyanurate groups include isocyanurate silanes such as tris(trimethoxysilyl)isocyanurate. Examples of alkoxy silanes having amino groups include silanes having an amino group such as γ-aminopropyltrimethoxysilane, γ-aminopropyltriethoxysilane, γ-aminopropylmethyldimethoxysilane, γ-aminopropylmethyldiethoxysilane, N-(β-amonoethyl)-γ-aminopropyltrimethoxysilane, N-(β-amonoethyl)-γ-aminopropylmethyldimethoxysilane, N-(β-amonoethyl)-γ-aminopropyltriethoxysilane, N-(β-amonoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane. Examples of alkoxy silanes having a mercapto group include silanes having a mercapto group such as γ-mercaptopropyltrimethoxysilane, γ-mercaptopropyltriethoxysilane, γ-mercaptopropylmethyldimethoxysilane, and γ-mercaptopropylmethyldiethoxysilane. Examples of alkoxy silanes having a carboxyl group include carboxy silanes such as β-carboxyethyltriethoxysilane, β-carboxyethylphenylbis(2-methoxyethoxy)silane, and N-β-(carboxymethyl)aminoethyl-γ-aminopropyltrimethoxysilane. Examples of alkoxy silanes having a halogen group include silanes having a halogen such as γ-chloropropyltrimethoxysilane.

Modified derivatives such as amino-modified silyl polymers, silylated amino polymers, unsaturated aminosilane complexes, phenylamino long-chain alkylsilanes, aminosilylated silicones, and silylated polyesters may be also used as the silane coupling agents.

Furthermore, in terms of curing ability and adhesive property, alkoxy silanes having epoxy or (meth)acrylic groups are more preferable. Examples of the alkoxy silanes having an epoxy group include γ-glycidoxypropylmethyldimethoxysilane, γ-glycidoxypropyltrimethoxysilane, γ-glycidoxypropyltriethoxysilane, β-(3,4-epoxycyclohexy) ethyltrimethoxysilane, β-(3,4-epoxycyclohexy) ethyltriethoxysilane, and γ-glycidoxypropylmethyldiisopropenoxysilane. Examples of the alkoxy silanes having a (meth)acrylic group include γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane, and acryloxymethyltriethoxysilane. These alkoxy silanes may be used alone or in combination.

In order to further improve the adhesive property, catalysts for condensing the crosslinkable silyl group may be used with the adhesive agents. Examples of the catalysts for condensing the crosslinkable silyl group include organotin compounds such as dibutyltin dilaurate, dibutyltin diacetylacetonate, dibutyltin dimethoxide, and tin octylate; organoaluminum compounds such as aluminum acetylacetonate; organotitanium compounds such as tetraisopropoxy titanium and tetrabutoxy titanium.

Examples of the adhesive agent other than the silane coupling agents are not limited. Examples of the adhesive agent include epoxy resin, phenol resin, sulfur, alkyl titanates, and aromatic polyisocyanates.

The content of the adhesive agents is preferably 0.01 to 20 parts by weight to 100 parts by weight of the vinyl polymer. When the content of the adhesive agents is less than 0.01 parts by weight, the improvement of the adhesive properties is not sufficient. When the content of the adhesive agents exceeds 20 parts by weight, the physical properties of the cured material are poor. The content of the adhesive agents is more preferably 0.1 to 10 parts by weight, and most preferably, 0.5 to 5 parts by weight.

The adhesive agents may be used alone or in combination. Adding these adhesive agents improves the adhesive property to adherends.

<Molding Processes>

The reactive compositions susceptible to hydrosilylation of the present invention may be used for general molding processes to produce molded articles. Examples of the molding process include casting, compression molding, transfer molding, injection molding, extrusion molding, rotational molding, blow molding, and thermoforming. In particular, injection molding is preferable due to high productivity by automation and a continuous process. When the reactive compositions susceptible to hydrosilylation are used as gaskets, both wet type and dry type are available. In the wet type, an uncured reactive composition susceptible to hydrosilylation is applied on, for example, a flange face and both sides of the flanges are pinched, and then the reactive composition is cured. In the dry type, the reactive composition susceptible to hydrosilylation is cured, and then both sides are pinched.

<Applications>

Applications of the reactive compositions susceptible to hydrosilylation of the present invention are not limited. Examples of applications include sealants such as architectural elastic sealants and sealants used for double glazing; electrical and electronic components such as sealants used for the rear-side of solar cells; electrical insulating materials such as insulating coating materials used for electrical wires and cables; adhesives; bonds; elastic bonds; paints; powdered paints; coating materials; foams; potting materials used for electrical and electronic components; films; gaskets; casting materials; synthetic marble; molding materials; and antirust and waterproof sealants used for end faces (cut sections) of wire glasses and laminated glasses.

Furthermore, molded articles having rubber elasticity produced from the reactive compositions susceptible to hydrosilylation of the present invention can be widely used as mainly, for example, gaskets and packings. For example, in the automobile field, the molded articles produced from the reactive compositions susceptible to hydrosilylation of the present invention can be used as body parts such as sealants to maintain air tightness, vibration isolating materials for glass, vibration isolating materials for automobile bodies, and in particular, gaskets used for windshields, and gaskets used for door glasses. The molded articles can be used as automobile chassis parts such as vibration-proof and soundproof engines, suspension rubbers, and in particular, engine mount rubbers. The molded articles can be used as engine parts such as hoses used for, e.g., cooling, fuel supply, and exhaust control; and sealants for engine oils. Furthermore, the molded articles can also be used as parts of purifying equipment of exhaust gas and brake parts. In the household electric appliances field, the molded articles can be used as packings, O-rings, and belts. Specifically, examples of the molded articles used in lighting equipment include ornaments, waterproof packings, rubber vibration isolators, and insect-proof packings. Examples of the molded articles used in a cleaner include a vibration isolating material, a sound absorption material, and an air sealant. Examples of the molded articles used in an electric water heater include a drip-proof cover, a waterproof packing, a heater packing, an electrode packing, and a diaphragm used for a safety valve. Examples of the molded articles used in a sake warmer (i.e., rice wine warmer) include hoses, a waterproof packing, and an electromagnetic valve. Examples of the molded articles used in a steam oven, a range and a jar rice cooker include a waterproof packing, a packing used for a feed water tank, a suction valve, a packing used for a water receiver, a connecting hose, a belt, a heater packing, oil packings for a burning appliance such as a seal of a steam outlet hole, an O-ring, a drain packing, a pressure tube, a blower tube, a packing used for air supply and intake air, a rubber vibration isolator, a packing used for an oil supply port, a packing used for an oil level indicator, an oil feed pipe, a diaphragm valve, and an air supply tube. Examples of the molded articles used in an acoustic instrument include a speaker gasket, a speaker edge, a turntable sheet, a belt, and a pulley. In the architectural field, the molded articles can be used as, for example, a structural gasket (zipper gasket), a roofing material having a pneumatic structure, a waterproof material, a preformed sealant, a vibration isolating material, a soundproof material, a setting block, and a sliding material. In the sports field, the molded articles can be used as, for example, floor materials for sports, such as a surface material for all weather facilities, a floor material for a gymnasium; sports shoes such as a shoe sole material and an inner sole material; and balls for ball games such as golf balls. In the rubber vibration insulator field, the molded articles can be used as, for example, rubber vibration insulators used for automobiles, rubber vibration insulators used for railroad vehicles, rubber vibration insulators used for aircrafts, and fender materials. In the ocean and civil engineering field, the molded articles can be used as structural materials such as a rubber expansion joint, a bearing, a water stop, a waterproof sheet, a rubber dam, an elastic pavement, a vibration-absorbing pad, and a protector; submaterials for construction such as a rubber molding flask, a rubber packer, a rubber skirt, a sponge mat, a mortar hose, and a mortar strainer; auxiliary materials for construction such as rubber sheets and an air hose; commodities for safety measures such as a rubber buoy and a material for wave dissipation; and commodities for environmental protection such as an oil boom, a silt fence, an antifouling material, a marine hose, a dredging hose, and an oil skimmer. Furthermore, the molded articles can also be used as, for example, a rubber plate, a mat, and a foam plate.

BEST MODE FOR CARRYING OUT THE INVENTION

The present invention will now be further described with reference to the following non-limiting examples in detail.

(Measurement of the Number Average Molecular Weight and Molecular Weight Distribution)

The number average molecular weight and the molecular weight distribution (the ratio of the weight average molecular weight to the number average molecular weight) were determined by gel permeation chromatography (GPC) with a polystyrene standard. The GPC columns used were filled with crosslinked polystyrene gel (Shodex GPC K-804 and K-8025; SHOWA DENKO K.K.) and the GPC solvent used was chloroform.

(Average Number of Functional Groups)

The average number of functional groups was calculated by $^1$H NMR (nuclear magnetic resonance) analysis and the number average molecular weight that was determined by GPC.

(Curing Test)

A polymer and a solution of xylene containing a linear siloxane (the linear siloxane includes five hydrosilyl groups on average and five substituents [—$CH_2$—$CH(CH_3)$—$C_6H_5$] on average per molecule, and the amount of Si—H group was 3.70 mmol/g) and 1,1,3,3-tetramethyl-1,3-divinyldisiloxane complex of zero-valent platinum (content of the platinum: $1.3 \times 10^{-5}$ mmol/μL) were mixed manually to prepare a composition. The content of the linear siloxane was controlled so that the molar ratio of the alkenyl groups to the hydrosilyl groups was 1/1.5. The amount of platinum catalyst was represented by the molar ratio relative to the alkenyl groups. A fraction of the composition was heated on a hotplate at 130° C. with stirring in air to measure the gelation time.

(Measurement of Copper Content)

Ultrapure nitric acid and ultrapure sulfuric acid were mixed with the polymer to degrade the polymer by microwave treatment. The residual copper content in the degraded product was measured by an inductively coupled plasma mass spectrometer (ICP-MS) (HP-4500, Yokogawa Analytical Systems Inc.) to determine the residual copper content in the polymer.

Manufacturing Example 1

Method for Producing a Vinyl Polymer having Terminal Alkenyl Groups

In a 250-L reactor having a stirrer and a jacket, CuBr (1,740 g) was charged and the atmosphere in the reactor was replaced with nitrogen. Acetonitrile (13.5 kg) was added, hot water was supplied through the jacket, and the mixture was stirred for 30 minutes at 80° C. Butyl acrylate (212 kg) and diethyl 2,5-dibromoadipate (3,692 g) were added and the mixture was further stirred for 25 minutes at 80° C. Pentamethyldiethylenetriamine (herein after referred to as triamine) (60.7 g) was added to the mixture to initiate the reaction. Triamine (961 g) was appropriately added to the mixture during the reaction. After 8 hours from the initiation of the reaction, 1,7-octadiene (16.5 kg) and triamine (607 g) were added to the mixture and the mixture was stirred for 6 hours.

The polymer solution was heated at 100° C. under reduced pressure to evaporate acetonitrile and 1,7-octadiene. Then the residue was dissolved in the same weight of toluene.

A hydrotalcite adsorbent (2 parts by weight; Kyowaad 500SH, Kyowa Chemical Industry Co., Ltd.) and aluminum silicate (i.e., adsorbent) (2 parts by weight: Kyowaad 700SL, Kyowa Chemical Industry Co., Ltd.) were added to the solution containing 100 parts by weight of the polymer. The polymer solution was heated at 100° C. for 2 hours. The solution was subjected to solid-liquid separation with a de Laval type centrifuge (12,800 G, residence time: 2 minutes) to remove solid copper and the adsorbents. Furthermore, the hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.) were added to the polymer solution containing 100 parts by weight of the polymer. The polymer solution was heated at 100° C. for 2 hours. The solution was subjected to solid-liquid separation with the de Laval type centrifuge (12,800 G, residence time: 2 minutes). The polymer solution was heated under reduced pressure at 80° C. to evaporate toluene.

The resultant polymer (50 kg) and potassium acetate (725 g) were charged in a 250-L reactor. N,N-dimethylacetamide (hereinafter referred to as DMAC) (58 kg) was added to the mixture and the mixture was stirred at 100° C. for 8 hours under nitrogen atmosphere. DMAC in the mixture was evaporated under reduced pressure at 100° C. to recover a polymer that does not have a bromine group. The number average molecular weight of the polymer was 28,801, the molecular weight distribution of the polymer was 1.36, and the average number of alkenyl groups introduced per one polymer molecule was 2.83. The copper content in the polymer was 243 ppm by weight. According to the curing test of this polymer, when the content of the platinum catalyst was 0.008 equivalents, the curing time was 30 seconds.

In a 250-L reactor having a stirrer and a jacket, the above polymer (48.89 kg) was charged. The hydrotalcite adsorbent (969 g; Kyowaad 500SH, Kyowa Chemical Industry Co., Ltd.) and aluminum silicate (969 g; Kyowaad 700SL, Kyowa Chemical Industry Co., Ltd.) were added, and then the atmosphere in the reactor was replaced with nitrogen. The mixture was stirred at 150° C. for 5 hours to recover Polymer [1].

Polymer [1] was diluted with the same weight of toluene, and the adsorbents were removed by ultracentrifugation (9,100 G, processing time: 2 minutes). The resultant clear solution was condensed to recover the polymer. The copper content in the polymer was 33 ppm by weight. According to the curing test of this polymer, when the content of the platinum catalyst was 0.0016 equivalents, the curing time was 30 seconds.

EXAMPLE 1

Polymer [1] (about 50 g) produced by Manufacturing Example 1, i.e., Polymer [1] containing the adsorbents was charged in a 500-mL separable flask and was heated at 150° C. for 1 hour in air. Subsequently, the resultant polymer was diluted with the same weight of toluene, and the adsorbents were removed by ultracentrifugation (9,100 G, processing time: 2 minutes). The resultant clear solution was condensed to recover the polymer. According to the curing test of this polymer, when the content of the platinum catalyst was 0.0007 equivalents, the curing time was 30 seconds.

Manufacturing Example 2

Method for Producing a Vinyl Polymer having Terminal Alkenyl Groups

In a 250-L reactor having a stirrer and a jacket, CuBr (1.41 kg) was charged and the atmosphere in the reactor was replaced with nitrogen. Acetonitrile (12.63 kg) was added, hot water was supplied through the jacket, and the mixture was stirred for 30 minutes at 80° C. Butyl acrylate (42.00 kg), ethyl acrylate (60.37 kg), methoxyethyl acrylate (49.00 kg), and diethyl 2,5-dibromoadipate (3.93 kg) were added and the mixture was further stirred for 25 minutes at 80° C. Triamine (56.8 g) was added to the mixture to initiate the reaction. During the reaction, triamine (56.8 g) was further added five times to the mixture (284.0 g in total). After 6 hours from the initiation of the reaction, 1,7-octadiene (36.11 kg) and triamine (568 g) were added to the mixture and the mixture was stirred for 6 hours.

The reaction mixture (145 kg) was diluted with toluene (91 kg). The mixture was subjected to solid-liquid separation with a de Laval type centrifuge (12,800 G, residence time: 2 minutes).

The polymer solution was heated under reduced pressure at 100° C. to evaporate acetonitrile, 1,7-octadiene, and toluene. Then the resultant polymer (106 kg) was dissolved in toluene (100 kg). A hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.) were added to the solution containing 100 parts by weight of the polymer. The polymer solution was heated at 100° C. for 2 hours. The solution was subjected to solid-liquid separation with the de Laval type centrifuge (12,800 G, residence time: 2 minutes) to remove solid copper and the adsorbents. The polymer solution was heated under reduced pressure at 80° C. to evaporate toluene.

The resultant polymer (96 kg) and potassium acetate (2,184 g) were charged in a 250-L reactor. DMAC (90 kg) was added to the mixture and the mixture was stirred at 100° C. for 8 hours under nitrogen atmosphere. The mixture was heated under reduced pressure at 100° C. to evaporate DMAC to recover a polymer (Polymer [2]) that does not have a bromine group.

The number average molecular weight of Polymer [2] was 17,802, the molecular weight distribution of Polymer [2] was 1.18, and the average number of alkenyl groups introduced per one polymer molecule was 2.14. The copper content in the polymer was 171 ppm by weight. According to the curing test of this polymer, when the content of the platinum catalyst was 0.009 equivalents, the curing time was 30 seconds.

EXAMPLE 2

Polymer [2] (about 50 g) produced by Manufacturing Example 2 was charged in a 500-mL separable flask, and a hydrotalcite adsorbent (1 g; Kyowaad 500SH, Kyowa Chemical Industry Co., Ltd.) and aluminum silicate (1 g; Kyowaad 700SL, Kyowa Chemical Industry Co., Ltd.) were added to the polymer. Subsequently the mixture was stirred at 130° C. for 5 hours in air to prepare a polymer. The resultant polymer was diluted with the same weight of toluene and the adsorbents were removed by ultracentrifugation (9,100 G, processing time: 2 minutes). The resultant clear solution was condensed to recover the polymer. The copper content in the polymer was 21 ppm by weight. According to the curing test of this polymer, when the content of the platinum catalyst was 0.0006 equivalents, the curing time was 29 seconds.

Comparative Example 1

Polymer [2] (about 50 g) produced by Manufacturing Example 2 was charged in a 500-mL separable flask, and a hydrotalcite adsorbent (1 g; Kyowaad 500SH, Kyowa Chemical Industry Co., Ltd.) and aluminum silicate (1 g; Kyowaad 700SL, Kyowa Chemical Industry Co., Ltd.) were added to the polymer. Subsequently the atmosphere was replaced with nitrogen and the mixture was stirred at 130° C. for 5 hour to prepare a polymer. The resultant polymer was diluted with the same weight of toluene and the adsorbents were removed by ultracentrifugation (9,100 G, processing time: 2 minutes). The resultant clear solution was condensed to recover the polymer. The copper content in the polymer was 16 ppm by weight. According to the curing test of this polymer, when the content of the platinum catalyst was 0.002 equivalents, the curing time was 35 seconds.

According to the results of Example 2 and Comparative Example 1, when the treatment with the adsorbent was performed in an oxygen-containing atmosphere, the hydrosilylation proceeded with smaller amount of platinum catalyst, compared with the treatment with the adsorbent performed in nitrogen. Thus, the hydrosilylation activity of the polymer was significantly improved. Furthermore, the treatment with the adsorbent in an oxygen-containing atmosphere decreases the copper content, compared with the treatment with the adsorbent performed in nitrogen.

Manufacturing Example 3

Method for Producing a Vinyl Polymer Having Terminal Alkenyl Groups

In a 250-L reactor having a stirrer and a jacket, CuBr (1.11 kg) was charged and the atmosphere in the reactor was replaced with nitrogen. Acetonitrile (29.87 kg) was added, hot water was supplied through the jacket, and the mixture was stirred for 30 minutes at 80° C. Butyl acrylate (33.00 kg), ethyl acrylate (47.43 kg), methoxyethyl acrylate (38.87 kg), and diethyl 2,5-dibromoadipate (3.09 kg) were added and the mixture was further stirred for 25 minutes at 80° C. Triamine (45 g) was added to the mixture to initiate the reaction. During the reaction, triamine (45 g) was further added four times to the mixture (180 g in total). After 6 hours from the initiation of the reaction, the atmosphere in the reactor was deaerated under reduced pressure at 80° C. for 2 hours. 1,7-Octadiene (28.37 kg) and triamine (446 g) were added to the mixture and the mixture was stirred for 6 hours.

The polymer solution was heated under reduced pressure at 80° C. to evaporate acetonitrile and 1,7-octadiene. Then the resultant polymer was dissolved in the same weight of toluene.

The polymer solution was subjected to solid-liquid separation with a de Laval type centrifuge (12,800 G, residence time: 2 minutes). A hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.) were added to the polymer solution (199.4 kg) containing 100 parts by weight of the polymer. The polymer solution was heated at 120° C. for 6 hours. The solution was subjected to solid-liquid separation with the de Laval type centrifuge (12,800 G, residence time: 2 minutes) to remove solid copper and the adsorbents. The polymer solution was heated under reduced pressure at 100° C. to evaporate toluene.

The resultant polymer (73.4 kg) and potassium acetate (1,907 g) were charged in a 250-L reactor. DMAC (73.4 kg) was added to the mixture and the mixture was stirred at 100° C. for 8 hours under nitrogen atmosphere. The mixture was heated under reduced pressure at 100° C. to evaporate DMAC to recover a polymer (Polymer [3]) that does not have a bromine group.

The number average molecular weight of Polymer [3] was 16,962, the molecular weight distribution of Polymer [3] was 1.23, and the average number of alkenyl groups introduced per one polymer molecule was 1.60. The copper content in the polymer was 23 ppm by weight. According to the curing test of this polymer, when the content of the platinum catalyst was 0.02 equivalents, the curing time was 150 seconds.

EXAMPLE 3

Polymer [3] (72.35 kg) produced by Manufacturing Example 3 was charged in a 250-L reactor having a stirrer and a jacket, and a hydrotalcite adsorbent (3,600 g; Kyowaad 500SH, Kyowa Chemical Industry Co., Ltd.) and aluminum silicate (3,600 g; Kyowaad 700SL, Kyowa Chemical Industry Co., Ltd.) were added to the polymer. Subsequently the mixture was stirred at 130° C. for 5 hours in a gas phase containing 12.7% oxygen to prepare a polymer. The polymer was diluted with five times the weight of toluene. A filter paper (4 μm) and a filter aid (Radiolite #300, Showa Chemical Industry Co., Ltd.) were disposed in a Kiriyama funnel (60 mm in diameter) to form a filter aid layer (5 mm in thickness). The polymer solution was filtrated under reduced pressure. Toluene in the filtrate was evaporated and the copper content in the polymer was measured. The copper content was 2 ppm by weight or less. According to the curing test of this polymer, when the content of the platinum catalyst was 0.0003 equivalents, the curing time was 20 seconds.

Manufacturing Example 4

Method for Producing a Vinyl Polymer having Terminal Alkenyl Groups

In a 250-L reactor having a stirrer and a jacket, CuBr (1.01 kg) was charged and the atmosphere in the reactor was replaced with nitrogen. Acetonitrile (10.55 kg) was added, hot water was supplied through the jacket, and the mixture was stirred for 30 minutes at 80° C. Butyl acrylate (120 kg) and diethyl 2,5-dibromoadipate (2.11 kg) were added and the mixture was further stirred for 25 minutes at 80° C. Triamine (40.6 g) was added to the mixture to initiate the reaction. During the reaction, triamine (40.6 g) was further added four times to the mixture (162.4 g in total). After 6 hours from the initiation of the reaction, the atmosphere in the reactor was deaerated under reduced pressure at 80° C. for 2 hours. 1,7-Octadiene (12.90 kg) and triamine (406 g) were added to the mixture and the mixture was stirred for 6 hours.

The polymer solution was heated under reduced pressure at 80° C. to evaporate acetonitrile and 1,7-octadiene. Then the resultant polymer was dissolved in the same weight of toluene.

The polymer solution was subjected to solid-liquid separation with a de Laval type centrifuge (12,800 G, residence time: 2 minutes).

A hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.) were added to the polymer solution containing 100 parts by weight of the polymer. The polymer solution was heated at 100° C. for 2 hours. The solution was subjected to solid-liquid separation with the de Laval type centrifuge (12,800 G, residence time: 2 minutes) to remove solid copper. Thus, a polymer solution (Polymer solution [4']) was recovered.

The polymer solution was condensed to recover the polymer (Polymer [4]). The number average molecular weight of Polymer [4] was 25,832, the molecular weight distribution of Polymer [4] was 1.26, and the average number of alkenyl groups introduced per one polymer molecule was 1.77. The copper content in the polymer was 12 ppm by weight. According to the curing test of this polymer, when the content of the platinum catalyst was 0.002 equivalents, the curing time was 30 seconds.

EXAMPLE 4

Polymer solution [4'] (about 43.3 kg) produced by Manufacturing Example 4 was charged in a 100-mL autoclave, and a hydrotalcite adsorbent (0.433 g; Kyowaad 500SH, Kyowa Chemical Industry Co., Ltd.) and aluminum silicate (0.433 g; Kyowaad 700SL, Kyowa Chemical Industry Co., Ltd.) were added to the polymer solution. Subsequently the mixture was stirred at 150° C. for 1 hour in a gas phase containing 10% oxygen to prepare a polymer. The polymer was diluted with double the weight of methylcyclohexane. A filter paper (4 μm) and a filter aid (Radiolite #300, Showa Chemical Industry Co., Ltd.) were disposed in a Kiriyama funnel (60 mm in diameter) to form a filter aid layer (5 mm in thickness). The polymer solution was filtrated under reduced pressure. Methylcyclohexane in the filtrate was evaporated and the copper content in the polymer was measured. The copper content was 2 ppm by weight or less. According to the curing test of this polymer, when the content of the platinum catalyst was 0.0007 equivalents, the curing time was 36 seconds.

Comparative Example 2

Polymer solution [4'] (about 43.3 g) produced by Manufacturing Example 4 was charged in a 100-mL autoclave, and a hydrotalcite adsorbent (0.433 g; Kyowaad 500SH, Kyowa Chemical Industry Co., Ltd.) and aluminum silicate (0.433 g; Kyowaad 700SL, Kyowa Chemical Industry Co., Ltd.) were added to the polymer solution. Subsequently the atmosphere was replaced with nitrogen and the mixture was stirred at 150° C. for 1 hour to prepare a polymer. The polymer was diluted with double the weight of methylcyclohexane. A filter paper (4 μm) and a filter aid (Radiolite #300, Showa Chemical Industry Co., Ltd.) were disposed in a Kiriyama funnel (60 mm in diameter) to form a filter aid layer (5 mm in thickness). The polymer solution was filtrated under reduced pressure. Methylcyclohexane in the filtrate was evaporated and the copper content in the polymer was measured. The copper content was 2 ppm by weight or less. According to the curing test of this polymer, when the content of the platinum catalyst was 0.003 equivalents, the curing time was 36 seconds.

According to the results of Example 4 and Comparative Example 2, when the treatment with the adsorbent was performed in an oxygen-containing atmosphere, the hydrosilylation proceeded with smaller amount of platinum catalyst, compared with the treatment with the adsorbent performed in nitrogen. Thus, the hydrosilylation activity of the polymer was significantly improved.

EXAMPLE 5

Polymer solution [4'] (990 g) produced by Manufacturing Example 4, a hydrotalcite adsorbent (9.9 g; Kyowaad 500SH, Kyowa Chemical Industry Co., Ltd.), and aluminum silicate (9.9 g; Kyowaad 700SL, Kyowa Chemical Industry Co., Ltd.) were charged in a 2.8-L autoclave. Oxygen concentration in the gas phase was measured with an oxygen gas concentration meter. The oxygen concentration was 12.5%. (The gas phase contained oxygen atoms of 0.51 molar ratio to the copper content.) Subsequently, the solution was heated at 150° C. and maintained at the temperature for 1 hour. The polymer solution (about 100 g) was sampled, and then the oxygen concentration in the gas phase in the autoclave was measured. The oxygen concentration was 4.8%. A filter paper (4 μm) and a filter aid (Radiolite #300, Showa Chemical Industry Co., Ltd.) were disposed in a Kiriyama funnel (60 mm in diameter) to form a filter aid layer (5 mm in thickness). The sample polymer solution was filtrated under reduced pressure. Toluene in the filtrate was evaporated to recover the polymer.

Subsequently, as shown in Table 1, the oxygen concentration was controlled with a mixed gas composed of oxygen and nitrogen (oxygen content: 6%). Then the heat treatment was repeated and the solid-liquid separation was performed in the same way to recover the polymer.

Table 1 summarizes the molar ratio of charged oxygen atom [mol] to copper [mol], the molar ratio of consumed oxygen atom [mol] to copper [mol] in the polymer, and the copper content, and result of the curing test in the polymer.

Comparative Example 3

Polymer solution [4] produced by Manufacturing Example 4 was dissolved in the same weight of methylcyclohexane. The polymer solution (80 g) was charged in a 100-mL autoclave (effective volumetric capacity: 170 mL). Adsorbents, i.e., a hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.), were added to the polymer solution containing 100 parts by weight of the polymer. The gas phase in the autoclave was completely replaced with nitrogen and the autoclave was sealed. The temperature in the autoclave was increased and the solution was heated at 150° C. for 2 hours. The mixture was subjected to solid-liquid separation by ultracentrifugation (12,800 G, processing time: 2 minutes). Methylcyclohexane in the solution was evaporated to recover the polymer. The copper content in the polymer was 135 ppm by weight. According to the curing test of this polymer, when the content of the platinum catalyst was 0.045 equivalents, the curing time was 35 seconds.

Manufacturing Example 5

In a 250-L reactor having a stirrer and a jacket, CuBr (923 g) was charged and the atmosphere in the reactor was replaced with nitrogen. Acetonitrile (9.67 kg) was added, hot water was supplied through the jacket, and the mixture was stirred for 30 minutes at 80° C. Butyl acrylate (110 kg) and diethyl 2,5-dibromoadipate (1.93 kg) were added and the mixture was further stirred for 25 minutes at 80° C. Triamine (32.2 g) was added to the mixture to initiate the reaction. During the reaction, triamine (32.2 g) was further added four times to the mixture (128.8 g in total). After 6 hours from the initiation of the reaction, the atmosphere in the reactor was deaerated under reduced pressure at 80° C. for 2 hours. 1,7-Octadiene (11.82 kg) and triamine (322 g) were added to the mixture and the mixture was stirred for 10 hours. Thus, Polymer solution [5] was recovered.

A small fraction of the polymer solution was sampled, and the sample solution was diluted with three times the volume of toluene. The solid was separated by filtration to recover a solution of a polymer having terminal alkenyl groups (Polymer [5']). The number average molecular weight of Polymer [5'] was 25,632, the molecular weight distribution of Polymer [5'] was 1.28, and the average number of alkenyl groups introduced per one polymer molecule was 1.89.

TABLE 1

| Heating Time [h] | Internal Pressure [MPa] | Oxygen Concentration [%] | | Charged O/Cu [mol/mol] | Consumed O/Cu [mol/mol] | Cu Content [ppm by weight] | Result of Curing Test (Equivalents of Catalyst/Curing Time) |
|---|---|---|---|---|---|---|---|
| | | Before Heating | After Heating | | | | |
| 1 | 0.1 | 12.5 | 4.8 | 0.51 | 0.31 | — | 0.01/25 seconds |
| 2 | 0.2 | 5.9 | 1.9 | 1.08 | 0.70 | — | 0.005/25 seconds |
| 3 | 0.2 | 5.5 | 3 | 1.20 | 0.99 | 4 | 0.003/25 seconds |
| 5 | 0.2 | 6.5 | 3.9 | 1.54 | 1.35 | — | 0.002/30 seconds |
| 7 | 0.2 | 6.2 | 5.4 | 1.98 | 1.49 | — | 0.002/20 seconds |

Polymer solution [5] was heated under reduced pressure at 100° C. to evaporate acetonitrile and 1,7-octadiene to recover the polymer. The copper content in the polymer was 3,600 ppm by weight. The curing test was performed using this polymer. Although 0.1 equivalents of the platinum catalyst were added, the polymer was not cured within 3 minutes.

EXAMPLE 6

Polymer [5'] produced by Manufacturing Example 5 was dissolved in the same weight of methylcyclohexane. The polymer solution (80 g) was charged in a 100-mL autoclave (effective volumetric capacity: 170 mL). Adsorbents, i.e., a hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.), were added to the polymer solution containing 100 parts by weight of the polymer. The gas phase in the autoclave was controlled with nitrogen so that the oxygen concentration was 10%. (The gas phase contained oxygen atoms of 0.35 molar ratio to the copper content.) Then, the autoclave was sealed. The temperature in the autoclave was increased and the solution was heated at 150° C. for 2 hours. The solution was cooled to room temperature, and was subjected to solid-liquid separation by ultracentrifugation (12,800 G, processing time: 2 minutes). Methylcyclohexane was evaporated to recover the polymer. The copper content in the polymer was 54 ppm by weight. According to the curing test of this polymer, when the content of the platinum catalyst was 0.025 equivalents, the curing time was 25 seconds.

Comparative Example 4

Polymer [5'] produced by Manufacturing Example 5 was dissolved in the same weight of methylcyclohexane. The polymer solution (80 g) was charged in a 100-mL autoclave (effective volumetric capacity: 170 mL). The gas phase (90 mL) in the autoclave was controlled with nitrogen so that the oxygen content was 10%. (The gas phase contained oxygen atoms of 0.35 molar ratio to the copper content.) Then, the autoclave was sealed. The temperature in the autoclave was increased and the solution was heated at 150° C. for 2 hours. The solution was cooled to room temperature. A filter paper (4 μm) and a filter aid (Radiolite #700, Showa Chemical Industry Co., Ltd.) were disposed in a Kiriyama funnel (60 mm in diameter) to form a filter aid layer (5 mm in thickness). The polymer solution was filtrated under reduced pressure. Toluene in the filtrate was evaporated to recover the polymer. The copper content in the polymer was 121 ppm by weight. According to the curing test of this polymer, when the content of the platinum catalyst was 0.07 equivalents, the curing time was 27 seconds.

According to the results of Example 6 and Comparative Example 4, in a system without adsorbent, the heat treatment performed in an oxygen-containing atmosphere leads to remain a large amount of copper, i.e., a transition metal catalyst. Accordingly, a large amount of the platinum catalyst was necessary, and the hydrosilylation activity of the polymer was barely improved.

Comparative Example 5

A polymer was produced as in Example 6, but the gas phase in the autoclave was completely replaced with nitrogen. The copper content in the polymer was 541 ppm by weight. The curing test was performed using this polymer. Although 0.1 equivalents of the platinum catalyst were added, the polymer was not cured within 3 minutes.

According to the results of Example 6 and Comparative Example 5, when the treatment with the adsorbent was performed in an oxygen-containing atmosphere, the hydrosilylation proceeded with smaller amount of platinum catalyst, compared with the treatment with the adsorbent performed in nitrogen. Thus, the hydrosilylation activity of the polymer was significantly improved.

Manufacturing Example 6

In a 2-L separable flask having a stirrer, CuBr (8.39 g) was charged and the atmosphere in the reactor was replaced with nitrogen. Acetonitrile (87.92 g) was added and the temperature of the mixture was maintained at 80° C. in a water bath. The mixture was stirred at 80° C. for 30 minutes. Butyl acrylate (1,000 g) and diethyl 2,5-dibromoadipate (17.56 g) were added, and the mixture was further stirred for 25 minutes at 80° C. Triamine (0.29 g) was added to the mixture to initiate the reaction. During the reaction, triamine (0.29 g) was further added four times to the mixture (1.16 g in total). After 5 hours from the initiation of the reaction, the atmosphere in the reactor was deaerated under reduced pressure at 80° C. for 2 hours. 1,7-Octadiene (107.47 g) and triamine (2.9 g) were added to the mixture and the mixture was stirred for 4 hours. Thus, Polymer solution [6] was recovered.

A small fraction of the polymer solution was sampled, and the sample solution was diluted with three times the volume of toluene. The solid was separated by filtration to recover a solution of a polymer having terminal alkenyl groups (Polymer [6']). The number average molecular weight of Polymer [6'] was 24,807, the molecular weight distribution of Polymer [6'] was 1.24, and the average number of alkenyl groups introduced per one polymer molecule was 2.12.

EXAMPLE 7

Polymer solution [6] produced by Manufacturing Example 6 was heated at 80° C. to evaporate acetonitrile and octadiene. Subsequently, the polymer was dissolved in the same weight of toluene. The polymer solution (50 g) was charged in a 100-mL three-necked flask. While a hydrotalcite adsorbent (0.5 g; Kyowaad 500SH, Kyowa Chemical Industry Co., Ltd.) and aluminum silicate (0.5 g; Kyowaad 700SL, Kyowa Chemical Industry Co., Ltd.) were adding to the solution, the mixture was heated. A reflux condenser was attached to the three-necked flask and a gasbag was attached to the upper part in order to prevent vapor leakage. When the temperature of the mixture went up to 80° C., the mixture was maintained at the temperature for 2 hours. Then the mixture was cooled. The mixture was subjected to solid-liquid separation by ultracentrifugation (8,000 G, processing time: 2 minutes). Subsequently toluene was evaporated. According to the curing test of this polymer, when the content of the platinum catalyst was 0.008 equivalents, the curing time was 30 seconds.

EXAMPLE 8

The polymer was purified as in Example 7, but the temperature of the mixture was 100° C. According to the curing test of this polymer, when the content of the platinum catalyst was 0.006 equivalents, the curing time was 32 seconds. Increasing the temperature provided a better result compared with Example 7.

EXAMPLE 9

The polymer was purified as in Examples 7 and 8, but the temperature of the mixture was 150° C. According to the curing test of this polymer, when the content of the platinum catalyst was 0.003 equivalents, the curing time was 25 seconds. Increasing the temperature provided a better result compared with Example 8.

Manufacturing Example 7

In a 50-L reactor having a stirrer and a jacket, CuBr (251.3 g) was charged and the atmosphere in the reactor was replaced with nitrogen. Acetonitrile (1.64 kg) was added, hot water was supplied through the jacket, and the mixture was stirred for 30 minutes at 80° C. Butyl acrylate (30 kg) and diethyl 2,5-dibromoadipate (525 g) were added and the mixture was further stirred for 25 minutes at 80° C. Triamine (12.22 mL, 58.52 mmol) was added to the mixture to initiate the reaction. During the reaction, triamine (61.10 mL in total) was added to the mixture. After 6 hours from the initiation of the reaction, 1,7-octadiene (6.02 kg) and triamine (122.2 mL) were added to the mixture and the mixture was stirred for 10 hours. Thus, Polymer solution [7] was recovered.

A small fraction of the polymer solution was sampled, and the sample solution was diluted with three times the volume of toluene. The solid was separated by filtration to recover a solution of a polymer having terminal alkenyl groups (Polymer [7']). The number average molecular weight of Polymer [7'] was 25,288, the molecular weight distribution of Polymer [7'] was 1.23, and the average number of alkenyl groups introduced per one polymer molecule was 2.99.

EXAMPLE 10

Polymer solution [7] produced by Manufacturing Example 7 was evaporated under reduced pressure at 100° C. to remove acetonitrile and 1,7-octadiene in Polymer solution [7]. Subsequently, the polymer was dissolved in double the weight of toluene. The solid in the solution was removed with a disk centrifuge (LAPX 202, Alfa Laval K.K.) at 8,000 rpm. The liquid phase was condensed to recover the polymer. Subsequently, the polymer was dissolved in the same weight of toluene. Furthermore, adsorbents, i.e., a hydrotalcite adsorbent (2 parts by weight; Kyowaad 500SH, Kyowa Chemical Industry Co., Ltd.) and aluminum-silicate (2 parts by weight; Kyowaad 700SL, Kyowa Chemical Industry Co., Ltd.), were added to the polymer solution containing 100 parts by weight of the polymer. The mixture was charged in a 100-mL autoclave, and stirred at 150° C. for 4 hours. Then the solution was left to cool to room temperature, and was subjected to ultracentrifugation at 8,100 rpm for about 5 minutes. Toluene was removed from the resultant clear solution to recover the vinyl polymer. The residual copper content in the polymer was 40 ppm by weight.

EXAMPLE 11

Polymer solution [7] produced by Manufacturing Example 7 was evaporated under reduced pressure at 100° C. to remove acetonitrile and 1,7-octadiene in Polymer solution [7]. Subsequently, the polymer was dissolved in double the weight of toluene. The solid-liquid separation was performed as in Example 10, and then the polymer was dissolved in the same weight of toluene. Furthermore, adsorbents, i.e., a hydrotalcite adsorbent (1 part by weight; Kyowaad 500SH, Kyowa Chemical Industry Co., Ltd.) and aluminum silicate (1 part by weight; Kyowaad 700SL, Kyowa Chemical Industry Co., Ltd.), were added to the polymer solution contaianing 100 parts by weight of the polymer. The mixture was charged in a 100-mL autoclave, and was stirred at 150° C. for 4 hours. Then the solution was left to cool to room temperature, and was subjected to ultracentrifugation at 8,100 rpm for about 5 minutes. Toluene was removed from the resultant clear solution to recover the vinyl polymer. The residual copper content in the polymer was 35 ppm by weight.

Comparative Example 6

Polymer solution [7] produced by Manufacturing Example 7 was evaporated under reduced pressure at 100° C. to remove acetonitrile and 1,7-octadiene in Polymer solution [7]. The solid-liquid separation was performed as in Example 10. Subsequently, the polymer was dissolved in the same weight of toluene. The solution was charged in a 100-mL autoclave, and was stirred at 150° C. for 4 hours. Then the solution was left to cool to room temperature, and was subjected to ultracentrifugation at 8,100 rpm for about 5 minutes. Toluene was removed from the resultant clear solution to recover the vinyl polymer. The residual copper content in the polymer was 462 ppm by weight.

According to the results of Examples 10, 11 and Comparative Example 6, in a system without adsorbent, the heat treatment performed in an oxygen-containing atmosphere leads to remain a large amount of copper, i.e., a transition metal catalyst.

EXAMPLE 12

Polymer solution [7] produced by Manufacturing Example 7 was evaporated under reduced pressure at 100° C. to remove acetonitrile and 1,7-octadiene in Polymer solution [7]. Subsequently, the polymer was dissolved in double the weight of toluene. The solid-liquid separation was performed as in Example 10. Subsequently, the polymer was dissolved in the same weight of methylcyclohexane. Furthermore, adsorbents, i.e., a hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.) were added to the polymer solution containing 100 parts by weight of the polymer. The mixture was charged in a 100-mL autoclave, and was stirred at 150° C. for 4 hours. Then the solution was left to cool to room temperature, and was subjected to ultracentrifugation at 8,100 rpm for about 5 minutes. Toluene was removed from the resultant clear solution to recover the vinyl polymer. The residual copper content in the polymer was less than 10 ppm by weight.

Table 2 summarizes the results (the copper content in polymers having alkenyl groups, equivalents of the catalyst used in the curing tests of the polymers having alkenyl groups, and curing times in the curing tests with the equivalents of the catalyst) of the purified polymers and unpurified polymers in the above Examples and Comparative Examples.

TABLE 2

|  | Polymer | Solvent | Temperature | Adsorbent | Oxygen | Cu [ppm by weight] | Equivalents of Catalyst | Curing Time (sec.) |
|---|---|---|---|---|---|---|---|---|
| Example 1 | Manufacturing Example 1 | Not Used | 150° C. | Used | Used | — | 0.0007 | 30 |
| Example 2 | Manufacturing Example 2 | Not Used | 130° C. | Used | Used | 21 | 0.0006 | 29 |
| Example 3 | Manufacturing Example 3 | Not Used | 130° C. | Used | Used | <2 | 0.0003 | 20 |
| Example 4 | Manufacturing Example 4 | Not Used | 150° C. | Used | Used | <2 | 0.0007 | 36 |
| Example 5 | Manufacturing Example 4 | Methylcyclohexane | 150° C. | Used | Used | 4 | 0.003 | 25 |
| Example 6 | Manufacturing Example 5 | Methylcyclohexane | 150° C. | Used | Used | 54 | 0.025 | 25 |
| Example 7 | Manufacturing Example 6 | Toluene | 80° C. | Used | Used | — | 0.008 | 30 |
| Example 8 | Manufacturing Example 6 | Toluene | 100° C. | Used | Used | — | 0.006 | 32 |
| Example 9 | Manufacturing Example 6 | Toluene | 150° C. | Used | Used | — | 0.003 | 25 |
| Example 10 | Manufacturing Example 7 | Toluene | 150° C. | Used | Used | 40 | — | — |
| Example 11 | Manufacturing Example 7 | Toluene | 150° C. | Used | Used | 35 | — | — |
| Example 12 | Manufacturing Example 7 | Methylcyclohexane | 150° C. | Used | Used | <10 | — | — |
| Comparative Example 1 | Manufacturing Example 2 | Not Used | 130° C. | Used | Not used | 16 | 0.002 | 35 |
| Comparative Example 2 | Manufacturing Example 4 | Not Used | 150° C. | Used | Not used | <2 | 0.003 | 36 |
| Comparative Example 3 | Manufacturing Example 4 | Methylcyclohexane | 150° C. | Used | Not Used | 135 | 0.045 | 35 |
| Comparative Example 4 | Manufacturing Example 5 | Methylcyclohexane | 150° C. | Not Used | Used | 121 | 0.07 | 27 |
| Comparative Example 5 | Manufacturing Example 5 | Methylcyclohexane | 150° C. | Used | Not Used | 541 | 0.1 | Not Cured |
| Comparative Example 6 | Manufacturing Example 7 | Toluene | 150° C. | Not Used | Used | 462 | — | — |

EXAMPLE 13

Synthesis and Purification of Poly (n-butyl acrylate) Having One Terminal Bromo Group In a reactor having a stirrer, CuBr (4.2 parts by weight) and acetonitrile (44.0 parts by weight) were charged, and the mixture was stirred at 70° C. for 15 minutes in nitrogen. Butyl acrylate (100 parts by weight) and ethyl 2-bromobutyrate (9.5 parts by weight) were added, and the mixture was stirred sufficiently. Triamine (0.17 parts by weight) was added to the mixture to initiate the reaction. While the mixture was stirring at 80° C., butyl acrylate (400 parts by weight) was added dropwise continuously. During adding the acrylic ester dropwise, triamine (0.68 parts by weight in total) was further added several times to the mixture. When the conversion reached 96%, acetonitrile containing the residual monomer was evaporated at 80° C. to recover poly (n-butyl acrylate) having one terminal bromo group, i.e., having one terminal bromo group at one end of the polymer (hereinafter referred to as Polymer [8]). The number average molecular weight of Polymer [8] was 11,800 and the molecular weight distribution of Polymer [8] was 1.08.

A filter aid (2 parts by weight; zeolite R900, Showa Chemical Industry Co., Ltd.) and methylcyclohexane (100 parts by weight) were added to Polymer [8] (100 parts by weight). The mixture was stirred at 80° C. in nitrogen. The solid in the mixture was filtrated to prepare a solution of methylcyclohexane containing Polymer [8]. The copper content of the polymer was 59 ppm by weight.

Adsorbents (4 parts by weight in total), i.e., a hydrotalcite adsorbent (2 parts by weight; Kyowaad 500SH, Kyowa Chemical Industry Co., Ltd.) and aluminum silicate (2 parts by weight; Kyowaad 700SL, Kyowa Chemical Industry Co., Ltd.), were added to the solution of methylcyclohexane containing 100 parts by weight of Polymer [8]. The mixture was stirred at 80° C. for 2 hours in a mixed gas containing oxygen and nitrogen (oxygen content: 6%). The insoluble was removed and the polymer solution was condensed to recover a polymer having one terminal group (Polymer [8']). The number average molecular weight of Polymer [8'] was 11,800 and the molecular weight distribution of Polymer [8'] was 1.08. The copper content in the polymer was 2 ppm by weight or less.

EXAMPLE 14

Synthesis and Purification of Poly (n-butyl acrylate) having Two Terminal Bromo Groups In a reactor having a stirrer, CuBr (4.2 parts by weight) and acetonitrile (44.0 parts by weight) were charged, and the mixture was stirred at 70° C. for 15 minutes in nitrogen. Butyl acrylate (100 parts by weight) and diethyl 2,5-dibromoadipate (8.8 parts by weight) were added, and the mixture was stirred sufficiently. Triamine (0.17 parts by weight) was added to the mixture to initiate the reaction. While the mixture was stirring at 80° C., butyl acrylate (400 parts by weight) was added dropwise continuously. During adding the butyl acrylate dropwise, triamine (0.85 parts by weight in total) was further added several times to the mixture. When the monomer conversion reached 97%, acetonitrile containing the residual monomer was evaporated at 80° C. to recover poly (n-butyl acrylate) having two terminal bromo groups, i.e., having terminal bromo groups at both ends of the polymer (hereinafter referred to as Polymer [9]). The number average molecular weight of Polymer [9] was 24,200 and the molecular weight distribution of Polymer [9] was 1.23.

Polymer [9] (100 parts by weight) was diluted with methylcyclohexane (100 parts by weight). The solid in the mixture was filtrated to prepare a solution of Polymer [9].

Adsorbents (10 parts by weight in total), i.e., a hydrotalcite adsorbent (5 parts by weight;.Kyowaad 500SH, Kyowa Chemical Industry Co., Ltd.) and aluminum silicate (5 parts by weight; Kyowaad 700SL, Kyowa Chemical Industry Co., Ltd.), were added to the solution of methylcyclohexane containing 100 parts by weight of Polymer [9]. The mixture was stirred at 80° C. for 2 hours in a mixed gas containing oxygen and nitrogen (oxygen content: 21%). The insoluble was removed in an open system in a laboratory, and the polymer solution was condensed to recover a polymer having two terminal bromo groups (Polymer [9']). The number average molecular weight of Polymer [9'] was 24,500 and the molecular weight distribution of Polymer [9'] was 1.20. The copper content in the polymer was 2 ppm by weight or less.

EXAMPLE 15

Synthesis and Purification of Poly (n-butyl acrylate) having One Terminal Hydroxyl Group In a 50-L pressure reactor, cuprous bromide (251.82 g, 1.76 mol), acetonitrile (2.64 kg), butyl acrylate (33.6 L, 30 kg, 234 mol), diethyl 2,5-dibromoadipate (527 g, 1.46 mol), and pentamethyldiethylenetriamine (12.2 mL, 10.1 g, 58.5 mmol) were charged under nitrogen atmosphere, and the mixture was stirred at 70° C. for 150 minutes. According to gas chromatography, the consumption rate of the butyl acrylate was 98%. Then the mixture was heated under reduced pressure to remove volatile components. Acetonitrile (3.96 kg) and 5-hexenol (3.51 L, 2.93 kg, 29.3 mol) were added to the mixture and the mixture was further stirred at 80° C. for 8 hours. The mixture was heated under reduced pressure to remove volatile components to recover a polymer having a terminal hydroxyl group, i.e., having one terminal hydroxyl group at one end of the polymer (Polymer [10]). The number average molecular weight of Polymer [10] was 26,200 and the molecular weight distribution of Polymer [10] was 1.27. The introducing rate of hydroxyl group based on the number average molecular weight was 2.0.

Polymer [10] (100 parts by weight) was diluted with methylcyclohexane (100 parts by weight). The solid in the mixture was filtrated to prepare a solution of Polymer [10].

Adsorbents (10 parts by weight in total), i.e., a hydrotalcite adsorbent (5 parts by weight; Kyowaad 500SH, Kyowa Chemical Industry Co., Ltd.) and aluminum silicate (5 parts by weight; Kyowaad 700SL, Kyowa Chemical Industry Co., Ltd.), were added to the solution of methylcyclohexane containing 100 parts by weight of Polymer [10]. The mixture was stirred at 100° C. for 4 hours in a mixed gas containing oxygen and nitrogen (oxygen content: 6%). Solid-liquid separation was performed with a bag filter, and the polymer solution was condensed to recover a polymer having one terminal hydroxyl group (Polymer [10']). The number average molecular weight of Polymer [10'] was 26,900 and the molecular weight distribution of Polymer [10'] was 1.30. The copper content in the polymer was 2 ppm by weight or less. The average number of hydroxyl groups per one polymer molecule was 2.1.

INDUSTRIAL APPLICABILITY

Since the present invention is constituted as described above, the present invention can provide a simple, economical, and efficient method for improving the hydrosilylation activity of a vinyl polymer with maintaining the original properties of the vinyl polymer. Thus, the vinyl polymer can be preferably used as a component of a reactive composition susceptible to hydrosilylation; furthermore, the amount of the adsorbent in use can be decreased.

The invention claimed is:

1. A method for producing a vinyl polymer, comprising the steps of:
    polymerizing a vinyl monomer by atom transfer radical polymerization with a transition metal complex as a polymerization catalyst; and
    bringing the resultant vinyl polymer into contact with an adsorbent in the presence of an oxidizing agent, wherein the oxidizing agent comprises oxygen molecules, the oxidizing agent being a mixed gas comprising oxygen and nitrogen, the oxygen atom content in the mixed gas being 0.1 to 5,000 molar ratio to the total transition metal in the reaction system.

2. A method for producing a vinyl polymer, comprising the steps of:
    polymerizing a vinyl monomer by atom transfer radical polymerization with a transition metal complex as a polymerization catalyst; and
    bringing the resultant vinyl polymer into contact with an adsorbent in the presence of an oxidizing agent, wherein the oxidizing agent comprises hydrogen peroxide, the oxygen atom content in the hydrogen peroxide being 0.1 to 100 molar ratio to the total transition metal in the reaction system.

3. The method according to claim 1, wherein the oxidizing agent further comprises sodium percarbonate, the oxygen atom content in the sodium percarbonate being 0.1 to 100 molar ratio to the total transition metal in the reaction system.

4. The method according to claim 1, wherein the adsorbent is an inorganic adsorbent or an activated carbon.

5. The method according to claim 1, wherein the adsorbent is at least one selected from the group consisting of magnesium oxide, activated clay, aluminum silicate, activated alumina, and hydrotalcite compounds.

6. The method according to claim 1, wherein the step of bringing the vinyl polymer into contact with the adsorbent in the presence of the oxidizing agent is performed in a solvent-free system.

7. The method according to claim 1, wherein the step of bringing the vinyl polymer into contact with the adsorbent is performed at 20° C. to 250° C. in the presence of the oxidizing agent and a solvent, and the adsorbent is separated from the vinyl polymer by centrifugation, plain sedimentation, or filtration.

8. The method according to claim 7, wherein the step of bringing the vinyl polymer into contact with the adsorbent is performed at 80° C. to 250° C. in the presence of the oxidizing agent and the solvent.

9. The method according to claim 7, wherein the solvent has a relative dielectric constant of 5 or less at 25° C.

10. The method according to claim 7, wherein the solvent comprises at least one selected from the group consisting of n-hexane, cyclohexane, methylcyclohexane, ethylcyclohexane, toluene, xylenes, butyl acetate, and diethyl ether.

11. The method according to claim 1, wherein the step of polymerizing the vinyl monomer by atom transfer radical polymerization with the transition metal complex as the polymerization catalyst is performed in the presence of a polymerization solvent, the polymerization solvent is removed, and the resultant vinyl polymer is brought into contact with the adsorbent in the presence of the oxidizing agent.

12. The method according to claim 1, wherein the step of polymerizing the vinyl monomer by atom transfer radical polymerization with the transition metal complex as the polymerization catalyst is performed, the resultant vinyl polymer is brought into contact with the adsorbent in the presence of the oxidizing agent and a solvent, and the resultant vinyl polymer is brought into contact with the adsorbent in the presence of the oxidizing agent in a solvent-free system.

13. A method for producing a vinyl polymer, comprising the steps of:
   polymerizing a vinyl monomer by atom transfer radical polymerization with a transition metal complex as a polymerization catalyst; and
   bringing the resultant vinyl polymer into contact with an adsorbent in the presence of an oxidizing agent, wherein the step of bringing the resultant vinyl polymer into contact with the adsorbent is performed in the presence of water, the content of the water being 0.1 to 1,000 molar ratio to the total transition metal in the reaction system.

14. The method according to claim 1, wherein the central metal of the transition metal complex is an element in group 8, group 7, group 10, or group 11 in the periodic table.

15. The method according to claim 14, wherein the central metal of the transition metal complex is iron, nickel, ruthenium, or copper.

16. The method according to claim 14, wherein the central metal of the transition metal complex is copper.

17. The method according to claim 1, wherein the transition metal complex is prepared from CuBr.

18. The method according to claim 1, wherein the transition metal complex includes a polyamine ligand.

19. The method according to claim 1, wherein the transition metal complex includes a triamine ligand.

20. The method according to claim 1, wherein the vinyl polymer has at least one alkenyl group per molecule.

21. The method according to claim 20, wherein the alkenyl groups reside at terminals of the molecular chain of the vinyl polymer.

22. The method according to claim 20, wherein the vinyl polymer having alkenyl groups is produced by adding a compound having at least two carbon-carbon double bonds having low polymerizability, the compound being added during or after the polymerization in atom transfer radical polymerization.

23. The method according to claim 1, wherein the vinyl polymer has at least one bromine atom per molecule.

24. The method according to claim 1, wherein the vinyl polymer has at least one hydroxyl group per molecule.

25. The method according to claim 2, wherein the adsorbent is an inorganic adsorbent or an activated carbon.

26. The method according to claim 2, wherein the adsorbent is at least one selected from the group consisting of magnesium oxide, activated clay, aluminum silicate, activated alumina, and hydrotalcite compounds.

27. The method according to claim 2, wherein the step of bringing the vinyl polymer into contact with the adsorbent in the presence of the oxidizing agent is performed in a solvent-free system.

28. The method according to claim 2, wherein the step of bringing the vinyl polymer into contact with the adsorbent is performed at 20° C. to 250° C. in the presence of the oxidizing agent and a solvent, and the adsorbent is separated from the vinyl polymer by centrifugation, plain sedimentation, or filtration.

29. The method according to claim 28, wherein the step of bringing the vinyl polymer into contact with the adsorbent is performed at 80° C. to 250° C. in the presence of the oxidizing agent and the solvent.

30. The method according to claim 28, wherein the solvent has a relative dielectric constant of 5 or less at 25° C.

31. The method according to claim 28, wherein the solvent comprises at least one selected from the group consisting of n-hexane, cyclohexane, methylcyclohexane, ethylcyclohexane, toluene, xylenes, butyl acetate, and diethyl ether.

32. The method according to claim 2, wherein the step of polymerizing the vinyl monomer by atom transfer radical polymerization with the transition metal complex as the polymerization catalyst is performed in the presence of a polymerization solvent, the polymerization solvent is removed, and the resultant vinyl polymer is brought into contact with the adsorbent in the presence of the oxidizing agent.

33. The method according to claim 2, wherein the step of polymerizing the vinyl monomer by atom transfer radical polymerization with the transition metal complex as the polymerization catalyst is performed, the resultant vinyl polymer is brought into contact with the adsorbent in the presence of the oxidizing agent and a solvent, and the resultant vinyl polymer is brought into contact with the adsorbent in the presence of the oxidizing agent in a solvent-free system.

34. The method according to claim 2, wherein the central metal of the transition metal complex is an element in group 8, group 7, group 10, or group 11 in the periodic table.

35. The method according to claim 34, wherein the central metal of the transition metal complex is iron, nickel, ruthenium, or copper.

36. The method according to claim 34, wherein the central metal of the transition metal complex is copper.

37. The method according to claim 2, wherein the transition metal complex is prepared from CuBr.

38. The method according to claim 2, wherein the transition metal complex includes a polyamine ligand.

39. The method according to claim 2, wherein the transition metal complex includes a triamine ligand.

40. The method according to claim 2, wherein the vinyl polymer has at least one alkenyl group per molecule.

41. The method according to claim 40, wherein the alkenyl groups reside at terminals of the molecular chain of the vinyl polymer.

42. The method according to claim 40, wherein the vinyl polymer having alkenyl groups is produced by adding a compound having at least two carbon-carbon double bonds having low polymerizability, the compound being added during or after the polymerization in atom transfer radical polymerization.

43. The method according to claim 2, wherein the vinyl polymer has at least one bromine atom per molecule.

44. The method according to claim 2, wherein the vinyl polymer has at least one hydroxyl group per molecule.

* * * * *